United States Patent
Bodor et al.

(10) Patent No.: US 6,201,546 B1
(45) Date of Patent: Mar. 13, 2001

(54) SYSTEMS AND METHODS FOR GENERATING THREE DIMENSIONAL, TEXTURED MODELS

(75) Inventors: Robert Bodor, Eden Prairie; Thomas B. Myers, Prior Lake, both of MN (US)

(73) Assignee: Point Cloud, Inc., Plymouth, MN (US)

(*) Notice: Subject to any disclaimer, the term of this patent is extended or adjusted under 35 U.S.C. 154(b) by 0 days.

(21) Appl. No.: 09/087,077

(22) Filed: May 29, 1998

(51) Int. Cl.[7] .................................................. G06T 7/40
(52) U.S. Cl. .......................... 345/430; 345/420; 345/427
(58) Field of Search .................................. 345/430, 419, 345/423, 425, 427, 428, 420, 139, 150, 429, 418; 703/6, 1; 382/154, 441, 285, 276

(56) References Cited

U.S. PATENT DOCUMENTS

| | | | |
|---|---|---|---|
| 4,858,150 | 8/1989 | Aizawa et al. | 364/522 |
| 4,888,713 | 12/1989 | Falk | 364/522 |
| 4,935,879 * | 6/1990 | Ueda | 345/430 |
| 5,016,183 | 5/1991 | Shyong | 364/470 |
| 5,097,427 | 3/1992 | Lathrop et al. | 395/130 |
| 5,175,601 | 12/1992 | Fitts | 356/376 |
| 5,179,638 | 1/1993 | Dawson et al. | 395/125 |
| 5,255,352 | 10/1993 | Falk | 364/522 |
| 5,271,093 | 12/1993 | Hata et al. | 395/120 |
| 5,280,436 | 1/1994 | Kubota et al. | 364/559 |
| 5,307,450 | 4/1994 | Grossman | 395/123 |
| 5,333,245 | 7/1994 | Vecchione | 395/130 |
| 5,361,386 | 11/1994 | Watkins et al. | 395/130 |
| 5,363,476 * | 11/1994 | Kurashige et al. | 345/425 |
| 5,396,331 | 3/1995 | Kitoh et al. | 356/376 |
| 5,471,541 | 11/1995 | Burtnyk et al. | 382/153 |
| 5,479,597 | 12/1995 | Fellous | 395/154 |
| 5,511,153 * | 4/1996 | Azarbayejani et al. | 345/419 |
| 5,537,224 | 7/1996 | Suzuoki et al. | 358/462 |
| 5,544,291 * | 8/1996 | Gilley et al. | 345/423 |
| 5,550,960 | 8/1996 | Shirman et al. | 395/130 |
| 5,559,334 | 9/1996 | Gupta et al. | 250/360 |
| 5,561,746 | 10/1996 | Murata et al. | 395/119 |
| 5,566,285 | 10/1996 | Okada | 395/130 |
| 5,613,048 * | 3/1997 | Chen et al. | 345/419 |
| 5,649,173 | 7/1997 | Lentz | 395/513 |
| 5,657,432 | 8/1997 | Matsui | 395/129 |
| 5,659,672 | 8/1997 | Yutaka et al. | 395/130 |
| 5,671,343 * | 9/1997 | Kondo et al. | 345/419 |
| 5,673,377 | 9/1997 | Berkaloff | 395/130 |
| 5,684,886 | 11/1997 | Kamada et al. | 382/107 |
| 5,694,331 | 12/1997 | Yamamoto et al. | 364/514 |
| 5,706,418 | 1/1998 | Uchiyama | 395/130 |
| 5,708,764 | 1/1998 | Borrel et al. | 395/119 |
| 5,710,878 | 1/1998 | McCoy et al. | 395/129 |
| 5,721,691 * | 2/1998 | Wuller et al. | 703/1 |
| 5,982,378 * | 11/1999 | Kato | 345/430 |
| 5,988,862 * | 11/1999 | Kacyra et al. | 703/6 |
| 5,990,897 * | 11/1999 | Hanratty | 345/420 |
| 6,037,945 * | 3/2000 | Loveland | 345/420 |

FOREIGN PATENT DOCUMENTS

676724A2  4/1994  (EP) ............... G06T/15/10

* cited by examiner

Primary Examiner—Mark R. Powell
Assistant Examiner—Thu-Thao Havan
(74) Attorney, Agent, or Firm—Schwegman, Lundberg, Woesnner & Kluth, P.A.

(57) ABSTRACT

A method for creating a three dimensional, textured model of at least one object is provided. The method includes identifying regions of the at least one object in a number of two dimensional images of the at least one object. The method further interrelates the regions identified from the two dimensional images and stores data concerning the region, including its texture, in a data structure that represents the model of the object.

43 Claims, 24 Drawing Sheets

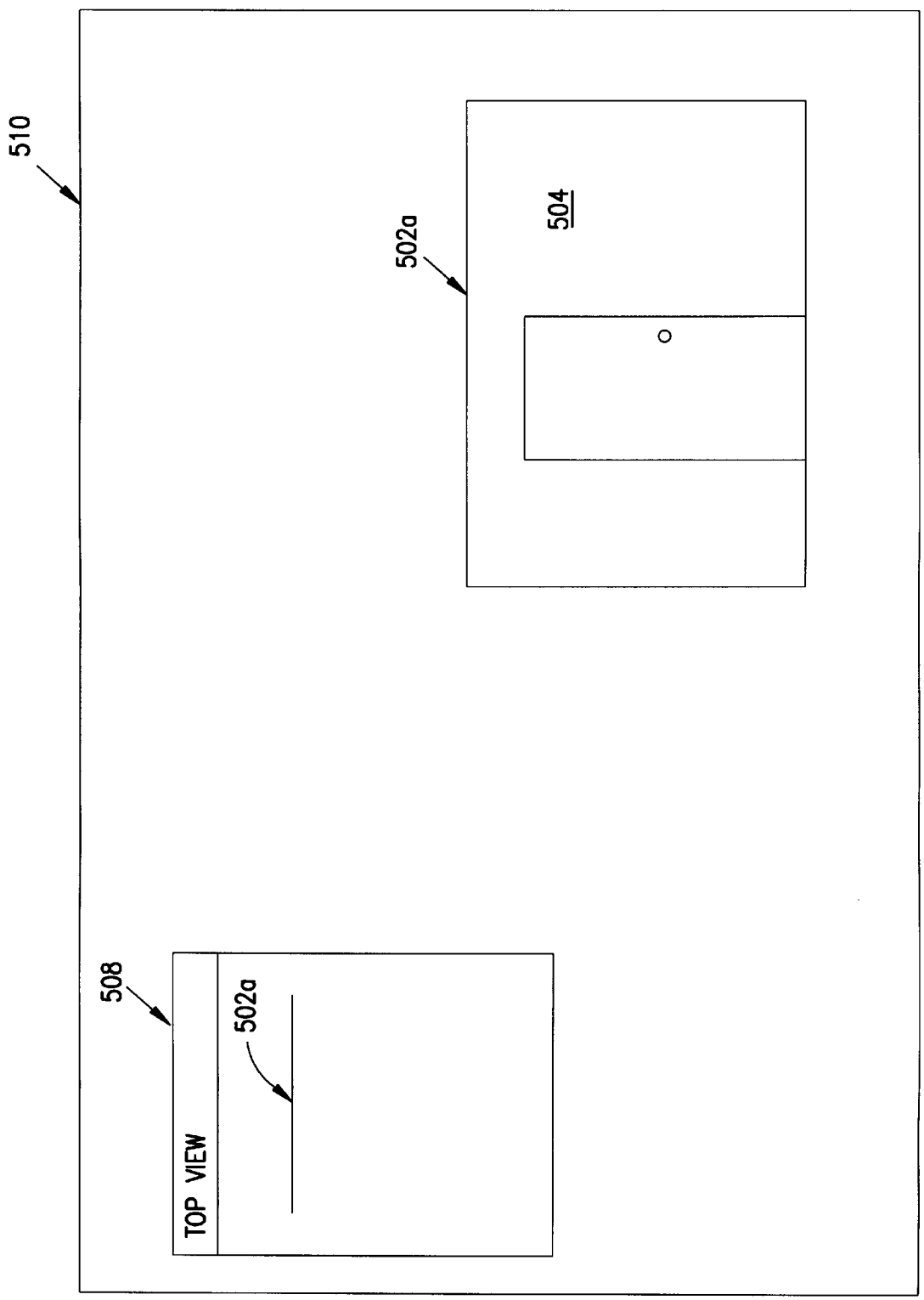

SYSTEMS AND METHODS FOR GENERATING THREE DIMENSIONAL, TEXTURED MODELS

TECHNICAL FIELD OF THE INVENTION

The present invention relates generally to the field of computer modeling and, in particular, to systems and methods for generating three dimensional, textured models.

BACKGROUND

Computers are used in a wide variety of applications. For example, computers are used to automate time consuming, labor intensive processes. To this end, computers have been used to great benefit in the area of product design and testing. So-called "computer aided design" (CAD) packages have replaced the pencil and ruler in creating specifications for future products. These CAD packages use the processing power of the computer to work through complex mathematical equations to create three dimensional "wire-frame" models of objects based on user inputs. A wire-frame model is simply a group of related polygons that represent the surfaces of the object being modeled in three dimensional space. In today's economy, these CAD packages are invaluable in, for example, the automotive industry to allow designs to be substantially tested before an actual product is manufactured. However, one problem with conventional CAD programs is the requirement of detailed knowledge of the exact dimensions of the object being modeled. Thus, initial model creation with a conventional CAD program is still time consuming and tedious.

In the graphics industry, three dimensional models are used in conjunction with "texture," e.g., color, lighting, that is placed on the model to represent the look of the object in its intended environment. Creating the texture for a three dimensional wire model is sometimes computationally prohibitive using conventional graphics techniques because of the complexity of the required rendering algorithms relating to photo-realistic rendering of complex lighting effects such as complex reflections, diffuse lighting, and hazy shadows all of which are commonplace in a real world setting. Thus, it is difficult, using conventional technology, to provide three dimensional, realistically textured models of real world objects.

For the reasons stated above, and for other reasons stated below which will become apparent to those skilled in the art upon reading and understanding the present specification, there is a need in the art for improved systems and methods for creating three dimensional, textured models.

SUMMARY OF THE INVENTION

The above mentioned problems with three dimensional modeling and other problems are addressed by the present invention and will be understood by reading and studying the following specification. According to one embodiment, a system and method for generating a three dimensional, textured model is described which uses data from two dimensional images of an object, scene or environment to derive the structure of the model. This embodiment can be used advantageously to create three dimensional models of homes for the real estate market. The system and method can also be used to model any other appropriate object, scene or environment beginning only with two dimensional images of the object, scene or environment.

In another embodiment, a system and method for generating a three dimensional, textured model is described that uses a library of scalable wire-frame models. The wire-frame models are selectively scaled based on properties of the texture to be fitted to the models. This embodiment of the invention can be readily applied in a variety of applications such as the printing and packaging industries through the creation of three dimensional computer models of printed media, e.g., magazines, or packages, e.g., boxes, bags, and cans. This embodiment of the invention can be used to model other objects as well.

The three dimensional models created using these systems and methods can be advantageously viewed over the Internet. Thus, in the real estate market, potential customers can save hours of aggravation in traveling from home to home to find a suitable floor plan by simply viewing the interior of many homes on-line. Similarly, in the advertising industry, substantial savings in time and expense can be achieved by using these systems and methods to create three dimensional package models for viewing over the Internet rather than the conventional method of creating and shipping a prototype of the package. Further, these three dimensional models can also be stored or transmitted using any number of other storage or transmission technologies, e.g., CD ROM.

In one embodiment, a method for creating a three dimensional, textured model of at least one object from a number of two dimensional images is provided. The method includes loading an initial two dimensional image and identifying a region of the at least one object in the loaded, two dimensional image. The method stores data concerning the region, including its texture, in a data structure. Next, the method sequentially loads the remaining two-dimensional images. For each of the remaining two dimensional images, the method identifies a relationship between the two dimensional image and at least one other, loaded two dimensional image. The method further identifies a region of the at least one object in the two dimensional image, and stores data concerning the region, including information on its position with respect to other regions, and the texture of the region, in a data structure.

In another embodiment, a method for creating a three dimensional, textured model of at least one object is provided. The method includes identifying regions of the at least one object in a number of two dimensional images of the at least one object. The method further interrelates the regions identified from the two dimensional images and stores data concerning the region, including its texture, in a data structure that represents the model of the object.

In another embodiment, a method for generating a three dimensional, textured model of at least one object is provided. The method includes determining the dimensions, in pixels, of a source image. The method further performs a series of transformations on target polygons of a selected model to resize the model so that its dimensions match those of the source image. The method maps the texture from the image onto the correctly-sized polygons without having to distort or transform the image.

In another embodiment, a method for generating a three dimensional, textured model of at least one object from a single texture image is provided. The method includes selecting a wire-frame base model. The single texture image is loaded. The method detects the edges of the image to find an outline. The method sub-divides the image into multiple images based on the selected model and the outline. The method determines the size of the images and adjusts the dimensions of the model based on the dimensions of the images. The method applies the subdivided images to the adjusted model and outputs the model into a selected format.

BRIEF DESCRIPTION OF THE DRAWINGS

FIGS. 5A, 5B, 5C, and 5D are screen shots of an embodiment of a graphical user interface that illustrate processing of images by the system of FIG. 1 to create a model of a structure.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

This specification describes embodiments of a method for creating three dimensional, textured models of objects from two dimensional images. For purposes of this specification, the term "texture" means a pixel array of color values representing the color, reflection, shading, shadows, and any other visual cues associated with a real world object's visible surfaces.

Part I of this specification describes an embodiment of a method for generating a three dimensional, textured model entirely from a collection of two dimensional images of one or more objects. In other words, the source of the texture for the model is used to define the structure of the model without the use of, for example, a conventional computer aided design (CAD) tool.

Part II of this specification describes a second embodiment for generating a three dimensional, textured model that uses one or more two dimensional images in conjunction with a scalable wire-frame model to create a realistically scaled three dimensional, textured model. The dimensions of the wire frame model are adjusted based on the relative sizes of the images used for each side/component of the model.

In both embodiments, the solutions are general in that the two dimensional, source images can be of any type and of any content. For example, four color graphic designs or full color photographs apply equally well to the technology. Further, the embodiments work with any image type such as GIF, JPEG, TIFF, PICT, etc.

Each of the described embodiments are implemented, for example, using a programmed computer. For example, the methods described below can be implemented on a personal computer using an application program or software code written in C++ language to carry out the processes described below. It is understood that other machines can be programmed using other appropriate languages to accomplish these methods within the scope of the present application.

Part I.

Figure 1:
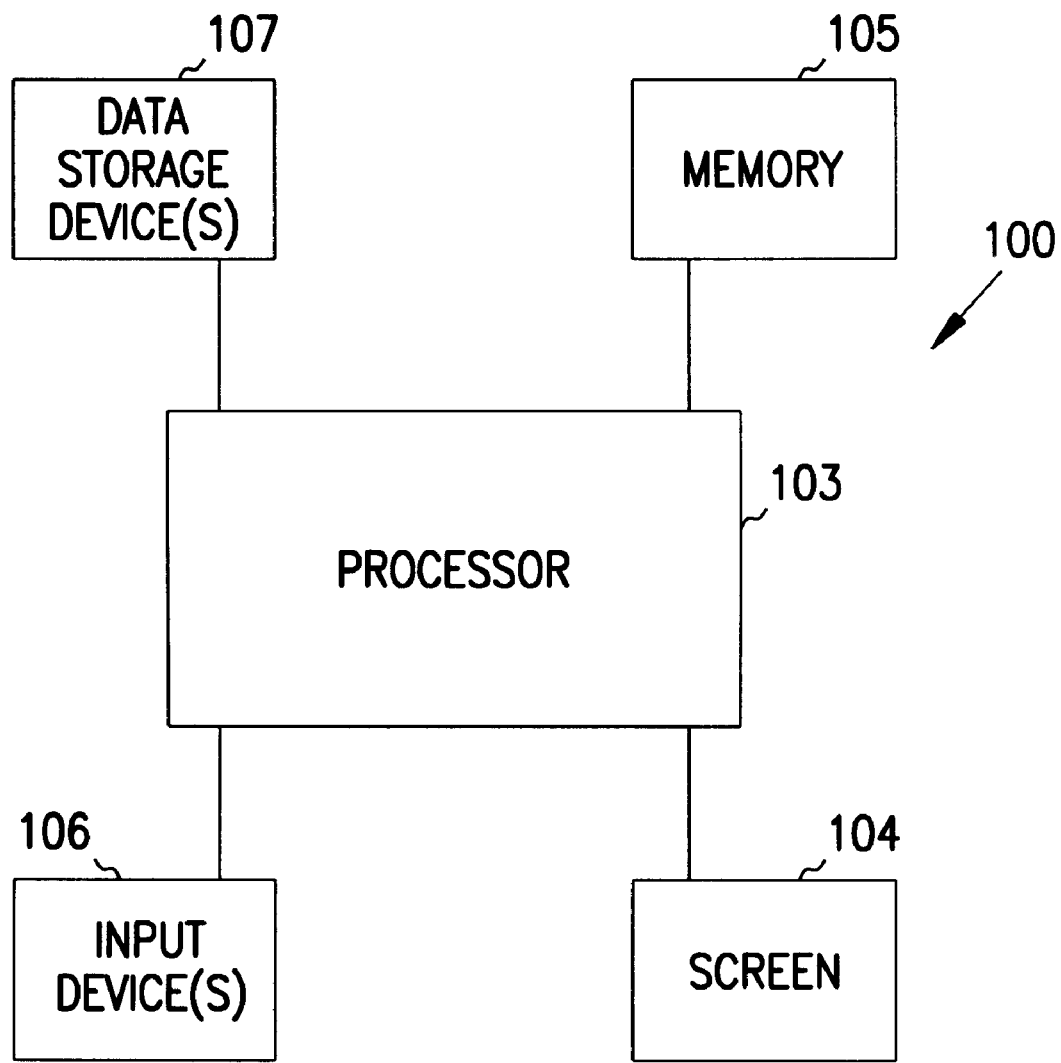
FIG. 1 is a block diagram of an embodiment of a system for creating three dimensional, textured models according to the teachings of the present invention.

This part of the specification describes an embodiment of a system and method for creating a three dimensional, textured model of an object or environment from data in two dimensional images of the object or environment. As shown in FIG. 1, system 100 is a micro-processor based computer. The computer includes processor 103 such as a Pentium processor from Intel Corporation. Processor 103 is coupled to memory 105, and data storage device(s) 107 (e.g., hard disk drive, floppy disk drive, CD ROM). The computer uses an operating system such as Windows 95 from Microsoft Corporation or other appropriate operating system. Processor 103 is further coupled to screen 104, and input devices 106. Input device(s) 106 includes, for example, a key pad, keyboard, mouse, touch screen, serial port or other device for providing inputs to processor 103.

The model is generated entirely from the images. All physical/proportional information about the object including its shape, size, dimension, proportions, and structure is derived from the images used to construct the model. The images themselves can be generated in any manner (e.g., paint program, digital photograph, scanner, computer drawing, etc.), and the solution is entirely independent of the manner in which the images are generated.

Overview

To begin the process, a number of digital still images are acquired from a real world environment or object. It is helpful if the images are acquired systematically. This means that images of the object, environment or scene are digitally acquired in such a way to completely cover the desired surfaces or regions contained in the object, environment or scene. For example, in generating a three dimensional model of a room for a real estate application, digital photographs of the walls in a room are taken in order going clockwise or counter-clockwise around the room. For other objects, scenes or environments, other systematic approaches to acquiring the digital images can be used. Thus, the approach used to acquire the images depends on the nature of the object, scene or environment and the approach may be different for various applications. The user provides information to system 100 as to the relationship between the images. The systematic approach to the acquisition of images makes it easier to provide this relationship information to system 100 to realize the advantages in the speed of processing the images as described in more detail below.

System 100 extracts texture based polygons from the images. System 100 generates a dynamic number of polygons representing the surfaces or regions of the environment, scene or object. System 100 assembles the polygons in a manner such that the resulting data set maintains the integrity, i.e., the texture of the source images. For photo-based source images, this can be a big benefit because the photograph acquired lighting and reflection effects (which are otherwise computationally prohibitive to recreate with conventional graphics techniques) are preserved. The number of polygons generated is dynamic in that it need not be predetermined in the model. As more source images are brought in, system 100 creates more polygons. Thus the user can build an increasingly complex model by simply loading and processing additional images.

Figure 2:
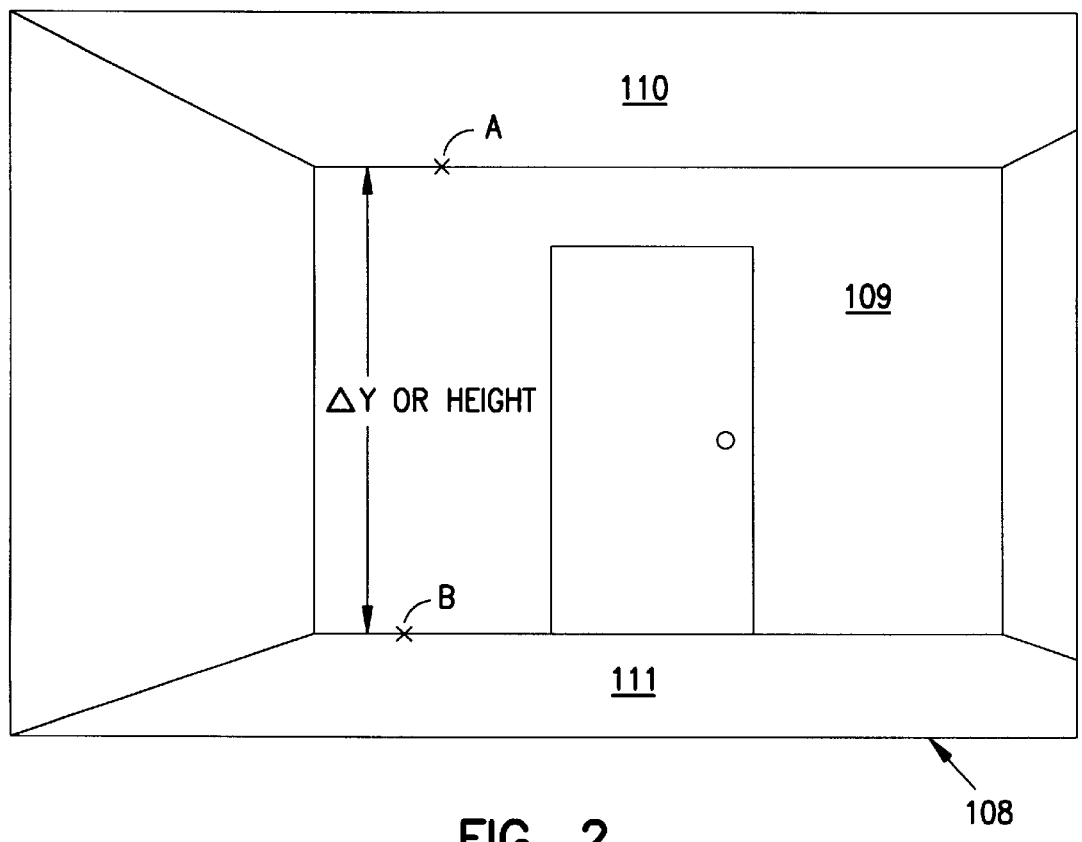
FIG. 2 is a representation of a digital image that illustrates an embodiment of a method for gathering dimensional information for surfaces of the object shown in the digital image.

System 100 uses the spatial information contained in the photographs to determine relative dimensions of the object being modeled. The spatial information is extracted from the photos through a single user-entered parameter. In the real estate example, the single parameter is the room height, or specifically, the distance from the floor to the ceiling. The user enters this parameter into system 100 through a graphical user interface. As shown in FIG. 2, the user clicks on two points, A and B, in an image 108 on screen 104 using input device 106, e.g., a mouse. The user then enters a distance value using input device 106, e.g., the height of the room in feet using a key pad or key board. Point A is on a line dividing the wall 109 from the ceiling 110 and point B is on a line dividing the wall 109 from the floor 111. The user need not line up points A and B exactly since System 100 is only interested in the height or "Y" component of the digitized points. System 100 subtracts the Y value of the point A from the Y value of the point B to find the distance, in pixels, between the floor 111 and ceiling 110. Since the user entered the height as well, system 100 now has a way to correlate pixels to feet in the image 108 (a pixel/foot parameter). Thus, with a single measurement, all dimensions in the image are known. This parameter can be assumed for some applications where a certain dimension is standard, thus improving things even further.

It is noted that this is done for each image as needed based on a known quantity in the image, e.g., a height from floor to ceiling. This value may also be independently set in each successive image.

System 100 provides a user-interface on screen 104 to allow a user to manipulate the images to determine the vertex points of a portion of the object in each image. The three dimensional, textured model is constructed by following a right or left hand based assembly pattern which reflects the order in which the images were acquired. The angles between each of the portions of the object from successive images are generated from user observation of the information contained in these images as well as additional images of the object being modeled from other vantage points. Thus, system 100 can be used advantageously to generate a three dimensional, textured model without plans or drawings of the object being modeled. Further, the model also advantageously conveys the feeling of the environment of the object in a true-to-life way.

It has been found to be quite sufficient for the user to enter in approximate angles between adjacent portions, e.g., walls, of the environment. That process, though it might be slightly inaccurate, results in a finished model with errors that are substantially undetectable in this respect. If the user had access to exact specifications or a drawing, exact angles in the finished model could be used. The end resulting data is quite effective at portraying the visual cues or "texture" desired of the representations of these complex real world scenes.

Real Estate Embodiment

In one embodiment, system 100 is used to process images to create a three dimensional, textured model of a house, apartment, town home, condominium or other real estate property. System 100 generates the model as a number of data structures based on information derived from a number of source images, e.g., digital photographs. As a preliminary matter, the data structures generated by system 100 are as follows.

As mentioned, system 100 extracts polygons that define surfaces or regions of the object being modeled from images of the object, scene or environment. This process automatically associates the desired texture with the polygon since the polygon is created from a textured image of the object. System 100 uses a data structure with the following properties to store the surface texture information: a data pointer to an array containing the Red, Green, Blue (RGB) eight bit data values and dimensional information about the array, including width and height.

Additionally, system 100 uses two main data structures in its model of the object scene or environment: an outer data structure containing the general model information entitled a "WorldObject" and a "sub-structure" of the WorldObject containing an individual surface or region entitled a SurfaceObject.

The WorldObject contains information about the surrounding environment, such as: viewpoints, backgrounds, navigation information, sound node additions, HyperLink connections, software tool mode information. The WorldObject also contains information about the object itself, such as: floor plan properties and modes, a linked list of all surfaces or regions in the object, save file compression and resolution information, and object file information.

Each SurfaceObject contains information about its surface or region, such as: x, y, z position of the center, orientation of the surface or region, width, height of the surface or region, the texture pixel array data structure (described above), complex edge definition point list including openings, flags describing the type of surface or region (Initial, Left-Right, etc.), pointers to other connected SurfaceObjects, and a pointer back to the outer WorldObject.

Various aspects of the SurfaceObject and the WorldObject are described in more detail below.

System 100 includes a number of procedures implemented in application software running on processor 103 to process the data and to generate the data structures. These procedures are described in turn below. It is understood that these procedures are provided by way of example and not by way of limitation. In a particular embodiment, any appropriate combination of these procedures can be used to create the three dimensional, textured model.

1. Data Pre-Processing Procedure

The order in which system 100 processes the individual images of the object, scene or environment being modeled can affect the overall speed of system 100. In one embodiment, a file loading order is determined which significantly reduces subsequent data processing time associated with the operation of system 100 on the individual images or "texture files," as well as the level of effort required by the user in building the model. According to this technique, the user selects certain types of connections between thumbnails of the source images before beginning to build the model. These selections seed the file open dialog boxes generated as part of the graphical user interface of system 100 with a pre-selected image or file at the correct time in the later stages of the process. This pre-selection reduces the effort and time of the user at each stage of the process by removing the need to manually search for each image when it is needed.

2. Image Loading

System 100 loads and processes images sequentially. System 100 loads images for processing by the application program in several modes. The modes in which a new image may be loaded are as follows:

1. Initial image in the model;
2. Right or left connected image;
3. Top or bottom connect image;
4. Floor or ceiling type connected image; or
5. Cabinet type mid-surface connection point image.

Subsequent to the initial image being processed, each further image that is loaded is related to another existing image loaded in system 100. This identifies the spatial relationship between the portions of the object, "the texture based polygons," "surfaces," "regions" or "texture," from adjacent images. In other words, an image in group 2 contains a portion (texture and polygon) for the object that is to the right or left of the portion (texture and polygon) from another, already processed image. This requirement for the connection of data from the various images ensures the continuity of the generated three dimensional model.

System 100 uses a conventional browsable file selection dialog box to select the next image file to be processed. As mentioned above, the file selection dialog box is preloaded with the next image based on the pre-processing described above after completion of the processing of each image.

Upon selection of an image file, the file header is read in and interpreted to determine the file format and then the resulting file data is sent through the appropriate file format converter to extract the 24 bit texture plane pixel array from the file. This pixel array is stored in a data object also containing information about the texture's initial dimensions. This data array is then optionally sent through pre-processing routines including the "De-FishEye" Lens distortion removal described in detail below.

3. Lens Distortion Preprocessing and Removal

As described above, the images processed by system 100 may come from a variety of sources. One possible source of input images is the a digital or conventional camera equipped with a "Wide Angle" or "Fish Eye" lens. The use of this type of lens allows the camera to capture a much larger surface area in a single image. Thus, a particular object can be modeled based on a smaller number of images compared to images generated using a camera with a regular lens.

The optics of this type of lens create spherical or ellipsoidal distortions in the source images which negatively effect the surface creation in this process by distorting straight edges in the images into curved surfaces. The removal of this effect in the images is achieved in a preprocessing step referred to as the "De-FishEye" process. This process does an inverted spherical or semi-spherical mapping of source image into a new image where the distortion curve in the source image is inverted to remove its effects. This step requires some physical knowledge of the lens that was used such as its focal point, field of view and dimensions. Removal of this type of distortion is common in the field of optics.

4. Image Clipping

Figure 3:
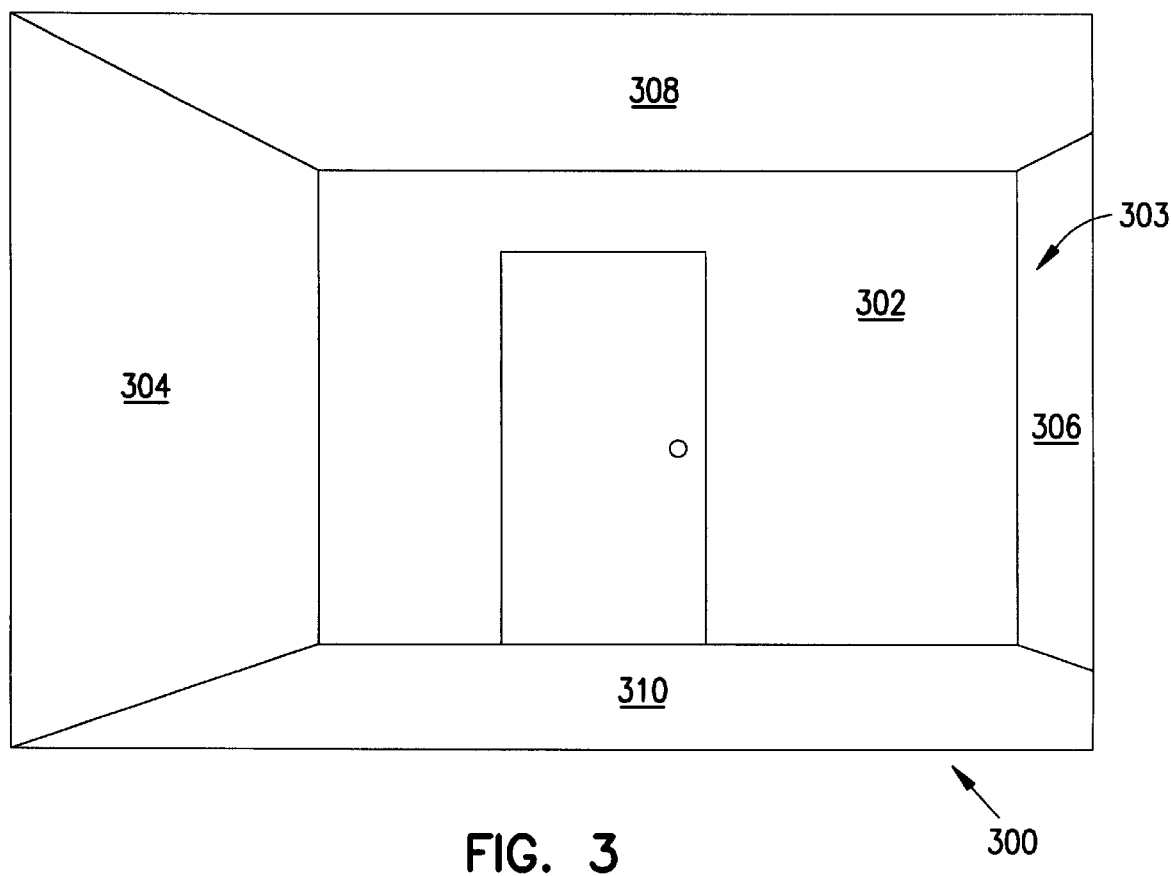
FIG. 3 is a representation of an embodiment of a method for extracting a surface of an object from a digital image according to the teachings of the present invention.
Figure 4:
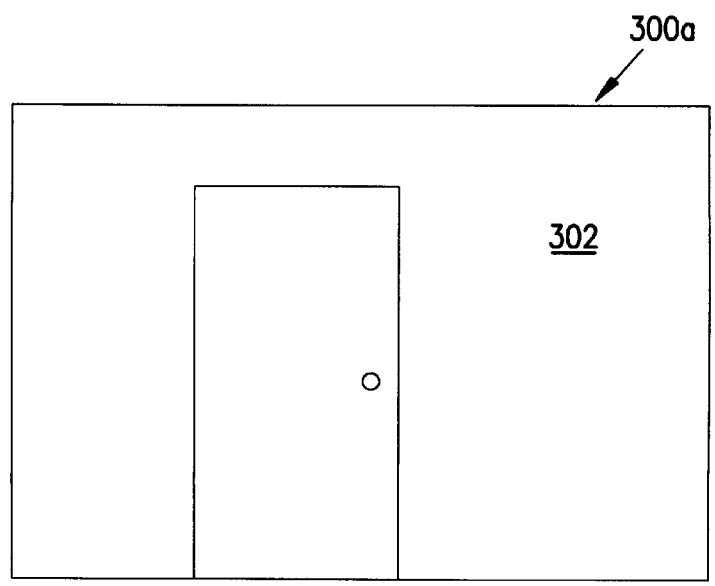
FIG. 4 is a representation of an embodiment of an image of an extracted surface.

Once the image is loaded, it can be processed to extract data on the object, scene or environment being modeled, e.g., define one or more polygons that make up a surface or region of the object being modeled. For example, FIG. 3 shows an image 300 on screen 104 of a wall 302 in a room 303 that is being modeled using system 100. The image 300 also contains portions of adjacent walls 304 and 306, the ceiling 308 and the floor 310. The portion of image 300 containing wall 302 is extracted from image 300 to be used in the model. FIG. 4 illustrates the clipped image 300a of wall 302. The graphical user interface of system 100 uses a number of standard selection tools to define the desired pixel area, e.g., wall 302. For example, area "click and drag" selection and tolerance limited color based area selection can be used.

Once the desired area is correctly selected, the extraneous pixel data is removed from the image. The remaining pixel data is inserted into a new pixel array which is correctly scaled to the new pixel array's maximum extent in both x and y directions. This pixel array is a "texture pixel array data structure" for a SurfaceObject. The possibly complex edge of this newly created array is stored in a linked list point to point connect structure that is a sub-structure to the "WorldObject" described above.

Upon defining the pixel array for this surface or region, the resulting polygon in three dimensional space is calculated based on the point list defining the edge of the selected surface or region. At this time the connection angle of the newly created surface or region is entered and accounted for in the creation of the new polygon. Each connection type results in a different alignment and surface normal direction of the generated polygon, with Left-Right connections generally resulting in a horizontal based surface normal, Top or Bottom connections and Floor-Ceiling type connections resulting in a generally up-down or similarly variant surface normal, while the Starting texture and "Cabinet" types allow a user definable surface normal.

5. Snap To Square Image Transformation

The selection of the edges of a surface or region in this process sometimes yields surfaces which are square cornered in reality but are out of square in relation to the pixel array used for storage. This gives the need for the use of an Image Warping technique referred to as "Coons Warp" to square the texture in relation to the pixel array. This is a somewhat common technique wherein a series of initial and final curves are defined for the texture and a "Bilinear Coons Patch Image Warp" mapping of the image is applied between the initial and final curves. See, e.g., *Graphics Gems IV*, Heckbert, Paul S., Academic Press Professional Publishing, 1994. In this case the initial curve is the edge of the polygon defined in the selection process and the final curve is the edge of the "square cornered" pixel array. The length the initial curve is calculated and used to determine the dimensions of the square cornered pixel array. This achieves the effect of "snapping" the selected area to the pixel array and simultaneously conserves the dimensional properties of the source texture.

6. Advanced Clipping Tool

An advanced user interface algorithm consisting of a non-square clipping tool with object-oriented image manipulation features has been developed to provide a broad range of two dimensional object building blocks. This tool allows for complex two dimensional image shapes to be clipped and used as objects. This allows a much broader range of two dimensional object building blocks than just rectangular walls to be available.

The creation of the polygon surfaces or regions from the textures creates a polygon which has a 1 to 1 mapping between the vertex points on the desired edge of the texture and the vertices of the resulting polygon. The ability to create "non-square" polygon surface mapping is handled by the user selecting the corner points of the desired resultant non-square polygon with either a point by point selection tool or any of the commonplace user interface selection tools used in image processing, including similar area selection, constructive solid geometry addition or subtraction, drag selection, or any other similar processes. The organic selection ability allows for the creation of highly complex surface or region shapes to be created including organic real world objects such as plants or complex edges in package labels.

7. Model Building Procedure

The user builds the entire object or property in an organized manner, one surface/region/image at a time. The data structures described above store the links and relative locations of the surfaces or regions and the associated texture based on the direction they are built in relative to the previous image/surface/region. For example, the first image is opened and processed by system 100. When the second image is to be added, for example a wall to the right of a first wall in a room, the user selects the next image and specifies that it be added to the right or left of the current surface or region. The user also specifies the angle between the two images/surfaces/regions. The data structures record this addition and then prepares for the next image which can now be added to the right, top, or bottom of the new image.

Figure 5A:
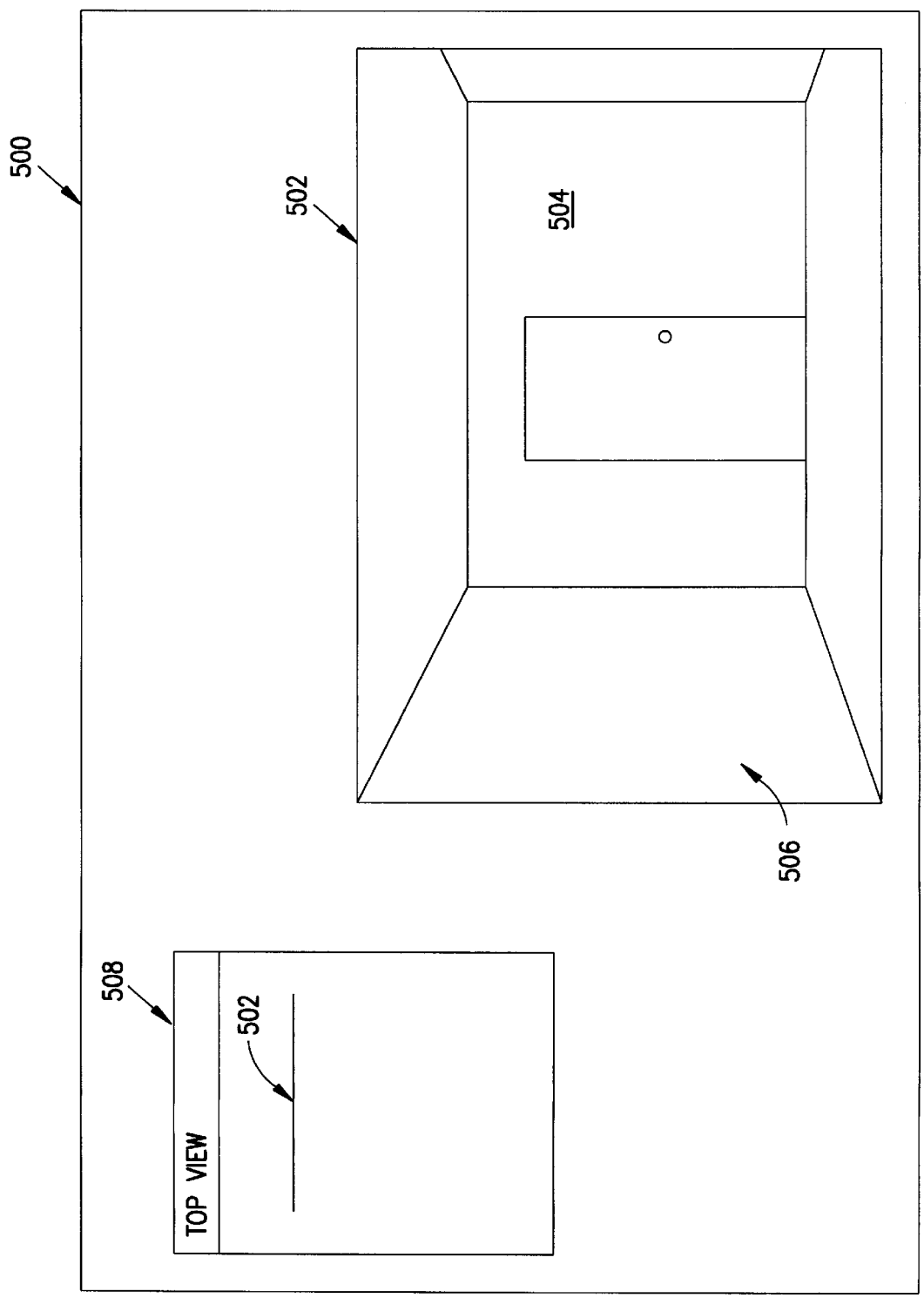
Figure 5C:
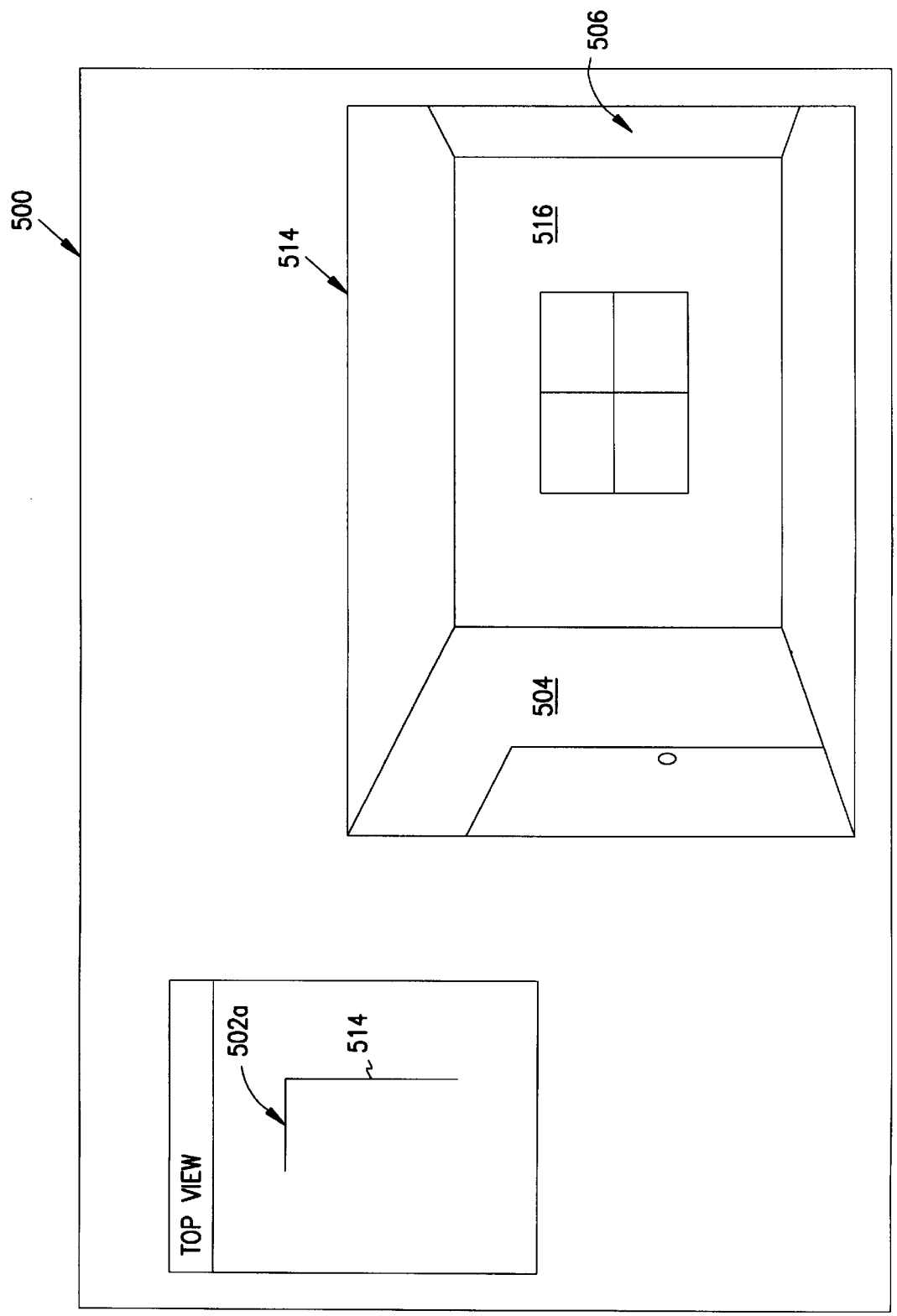

FIGS. 5A through 5C are graphical representations of digital images that illustrate the creation of a portion of a room according to an embodiment of the present invention.

FIG. 5A is a graphical representation of a screen shot 500 from a graphical user interface of system 100 that illustrates a digital image 502 including a first wall 504 of room 506. Screen shot 500 also shows a viewing window 508 that shows a top view of the model as described in more detail below in section 8. At this point, the model includes only image 502 in its entirety. Image 502 is still raw in that it has not been clipped to only show wall 502 as described above in section 4. Due to the wide angle lens used, the images often include more than necessary image content. For example, more than the particular wall of interest.

FIG. 5B is a graphical representation of a screen shot 510 that illustrates a modified image 502a with only first wall 504. The other portions of original image 502 were removed using the technique described above in section 4. Top view window 508 is dynamically updated with the shortened image 502a which is stored as part of the model.

FIG. 5C is a graphical representation of a screen shot 512 that illustrates a digital image 514 including first wall 504 and a second wall 516 of room 506. In screen shot 512, top view window 508 is updated to show the addition of image 514 to the model to the right of wall 504. Again, the model includes image 514 in its entirety. Image 514 is still raw in that it has not been clipped to only show wall 516.

Figure 5D:
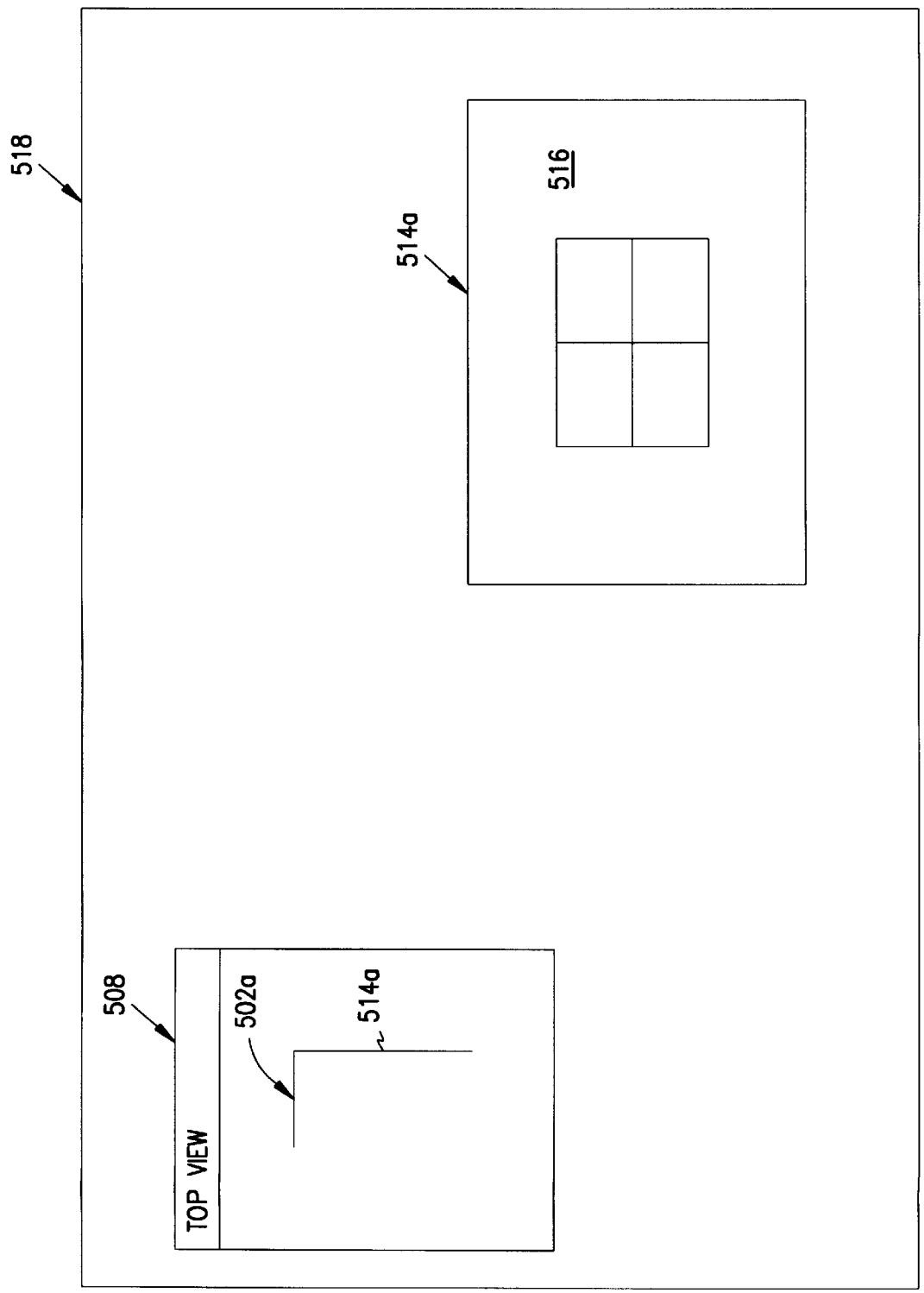

FIG. 5D is a graphical representation of a screen shot 518 that illustrates a modified image 514a with only first wall 516. The other portions of original image 514 were removed using the technique described above in section 4. Top view window 508 is dynamically updated with the shortened image 514a which is stored as part of the model.

This technique is repeated as many times as necessary to add surfaces or regions of the object to the model until the model is sufficiently complete. It is noted that as each image is opened, a known dimension can be entered into system 100 using the technique described above to allow proper sizing of the various images that make up the model.

8. Top View Real Time Updating

Since the data structures continually track of wall positions, it is possible to display each new wall as it is added to the structure. This display is done in a window of the graphical user interface to provide feedback to the user as the model is constructed. It is also available for output in various formats, both electronic and printed, as a two dimensional map of the object being modeled.

The creation of a new surface/region/texture allows for a dynamic updating of the top view in real-time as the surface normal properties are defined for each of the new textures/surfaces/regions. This top view previewing mode may be displayed in a variety of modes ranging from a real-time interactive three dimensional view down to a two dimensional orthographic axis projection. The method of display is user selectable through the standard system "properties" dialog box.

9. Real Time Object Display

Real time display of the object in a three dimensional window is available to provide feedback to the user as the model is developed. In a separate window, the user can see the three dimensional model and manipulate it using standard 3D interface controls (move, rotate, etc.) as images and parts are being added. This greatly increases the accuracy and speed of the building process by allowing instant confirmation of the quality of the model being generated. The user may then reduce the number of later adjustments that may need to be done to the model by updating any errors in the surface or region immediately after they are built rather than in an additional step upon completion of the remainder of the model.

10. Opening Creation Tool

System 100 includes a procedure for clipping openings out of the middle of an image to create the effect of windows or doors, etc. Surfaces or regions on the other side of the wall can be seen through the opening. In this procedure, the user specifies any number of points on an image and the software removes that region from the image to create a surface or region with an opening. In addition, for cases where two images may be back to back, such as an inside wall in a property walk-through, the procedure automatically correlates matching points from the back-to-back surfaces or regions to create an opening, e.g., a window or a door, that is located in the same place when seen from both sides.

Figure 6:
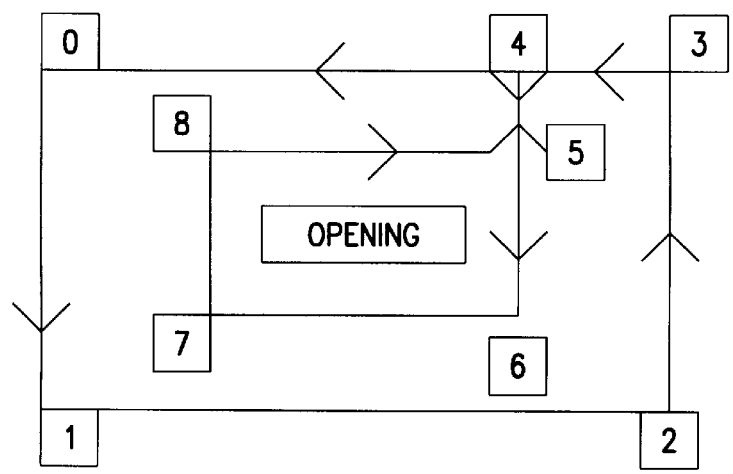
FIG. 6 is a schematic diagram of an embodiment of a process for clipping an image to create an opening in the model of the structure.

The ability to add openings to the surfaces or regions is achieved through the use of a "door clipping" procedure wherein an opening is selected through a "click and drag" interface for selecting a region on the image. The selected region then defines an opening in the surface or region which is implemented as a point list defining the edge of the surface or region tracing a path around the exterior of the surface or region moving to the interior opening region and then finally back to the exterior region for closure of the polygon as shown in FIG. 6. In the example of FIG. 6, the list of polygon vertices would be: {0, 1, 2, 3, 4, 5, 6, 7, 8, 5, 4, 0} to complete the surface or region, with the opening being the region defined by points 8, 7, 6, 5. The corresponding texture to this polygon would contain vertex points in a 1 to 1 mapping to the above polygon vertices, thus defining the texture region and the opening region simultaneously in the resulting polygon.

Figure 7A:
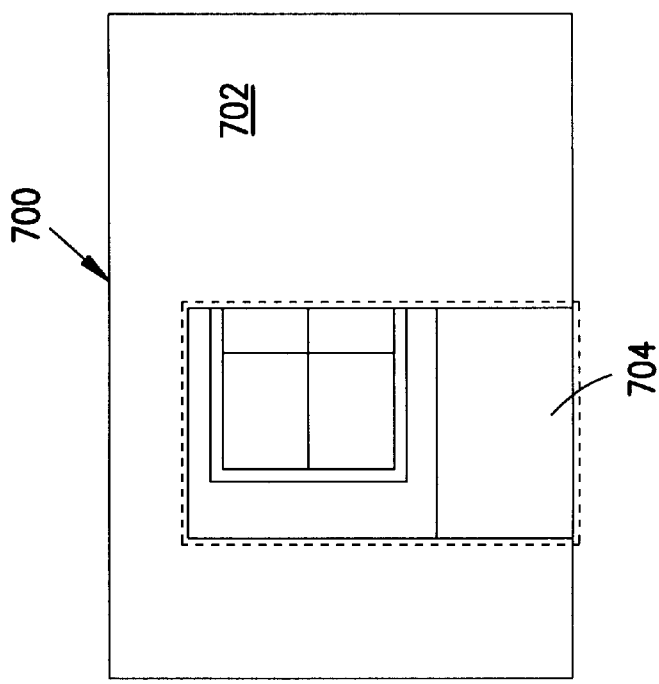
FIGS. 7A and 7B are screen shots of an embodiment of a graphical user interface that illustrate processing of images by the system of FIG. 1 to create an opening in the model of the structure.
Figure 7A:
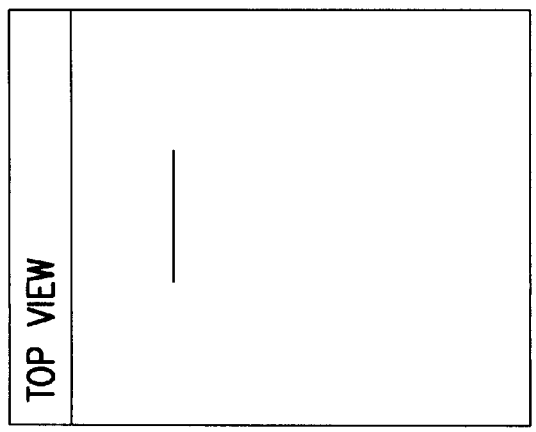
Figure 7B:
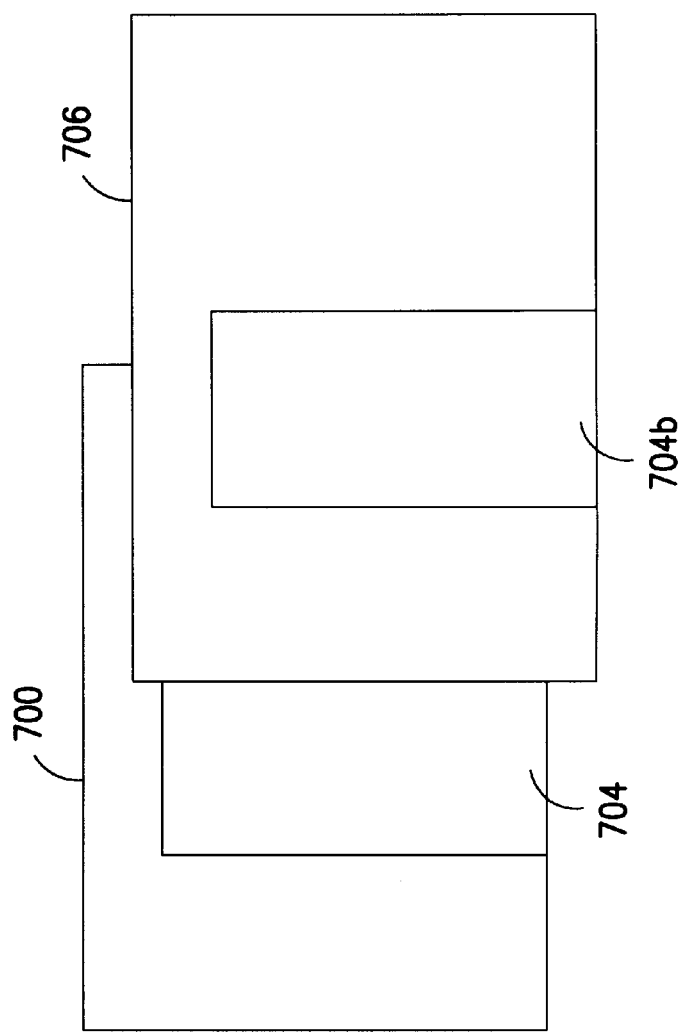
Figure 7B:
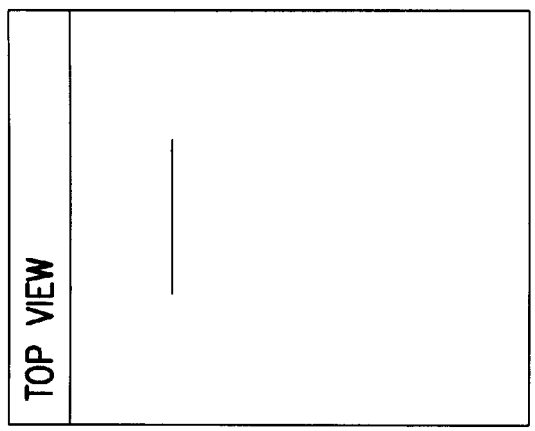

FIGS. 7A and 7B are graphical representation of screen shots that illustrate an embodiment of a process of creating a doorway in a wall surface/image. FIG. 7A shows image 700 of wall 702 having opening 704 through which an adjoining room is visible. The user selects a section to be clipped with the opening selection tool as described above. The dashed-lines indicate the section of the image 700 to be removed. Once the user selects the section to be cropped, system 100 deletes the appropriate section of the image and saves a new file with the section missing. It is noted that system 100 never overwrites the original files containing the images. System 100 then prompts the user to select a second wall image to represent the other side of the opening 704. When the image is identified, system 100 associates the two images together in the data structure and aligns the surfaces so that the openings will correspond.

In FIG. 7B, the image 700 is seen with a section removed, and a second wall image 706 has been loaded and an opening 704b clipped. Once the second opening 704b is clipped, system 100 automatically puts images 700 and 706 back to back and aligns the openings 704 and 704b.

11. Object Building Tool

The types of structures encountered in a real world environment sometimes extended beyond the realm of edge of texture to edge of texture organization. This complexity of the source data is handled through the use of a "cabinet building" functionality system 100 which allows the user to define a connecting surface/region that extends from any starting point on a starting surface or region. This allows more complex objects which do not connect directly from the edge of a wall to the edge of a wall to be created as easily as simpler objects such as wall to wall connections.

The successful creation of highly complex objects sometime requires the need to create connecting surfaces ore regions which are not aligned with any edge of a preceding surface ore region. This need is resolved through a mid-texture connection point functionality wherein a new surface or region may be created through the selection of any point on a surface or region and then defining the desired traits of the newly connected surface or region. These traits include, for example: the surface normal direction, the angle of intersection between the surfaces or regions and the possible alignment of one of the new surface's edges to an edge of the preceding surface or region (e.g., floor or ceiling aligned). Then the standard file open and preprocessing occurs for this newly opened surface or region and this new surface or region contains all of the functionality of any other surface or region.

Figure 8:
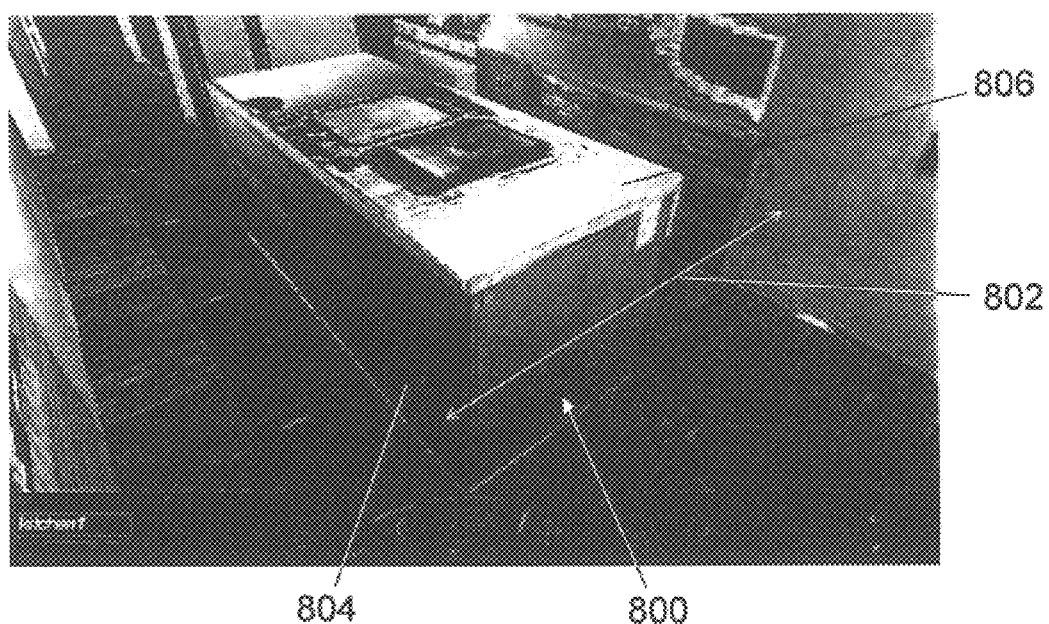
FIG. 8 is a screen shot that illustrates an object constructed using the system of FIG. 1.
Figure 9:
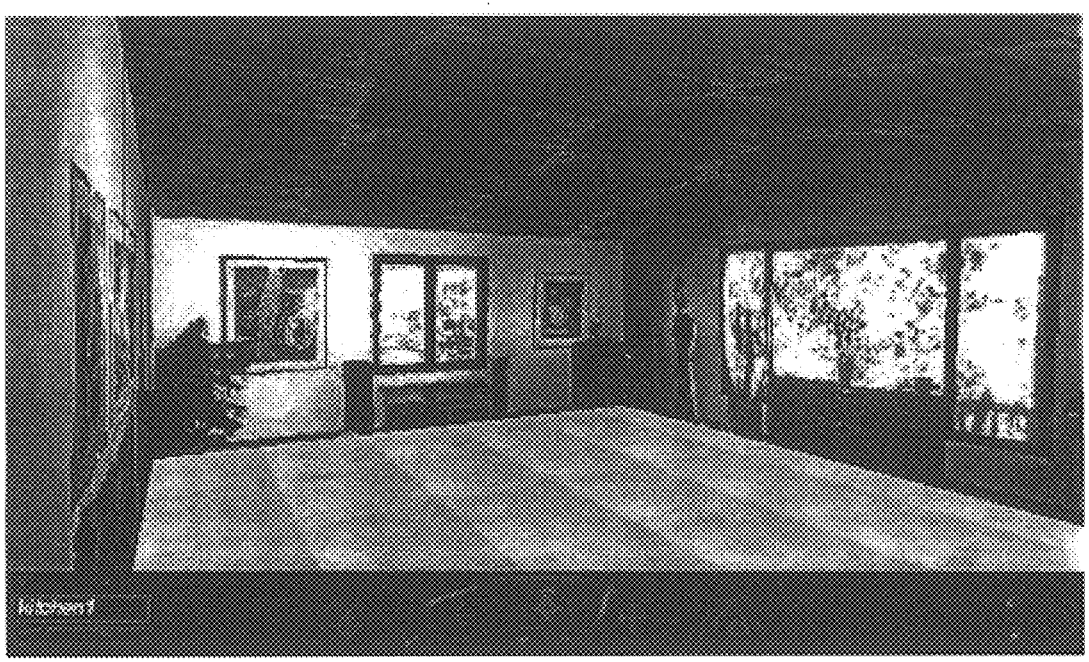
FIGS. 9, 10, 11, and 12 are screen shots that illustrate various modes for viewing models constructed according to the teachings of the present invention.
Figure 10:
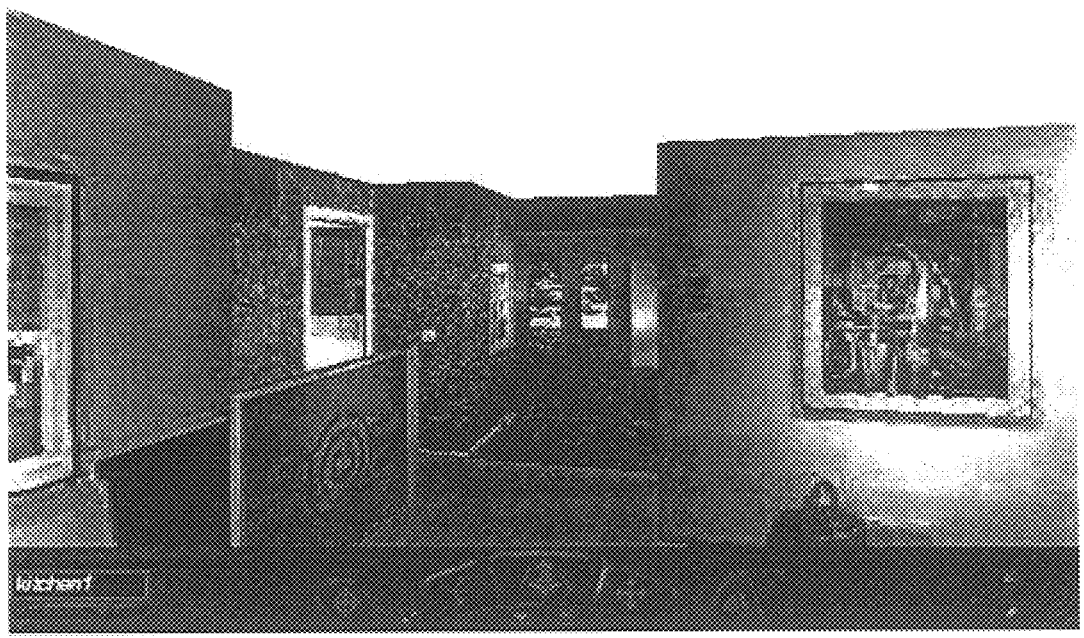
Figure 11:
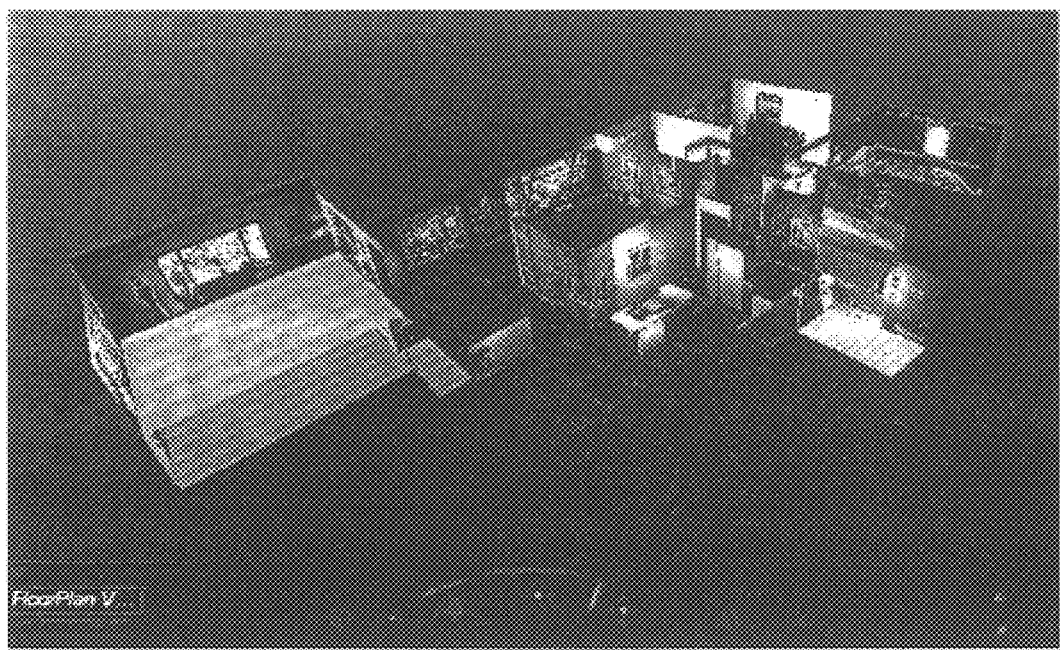
Figure 12:
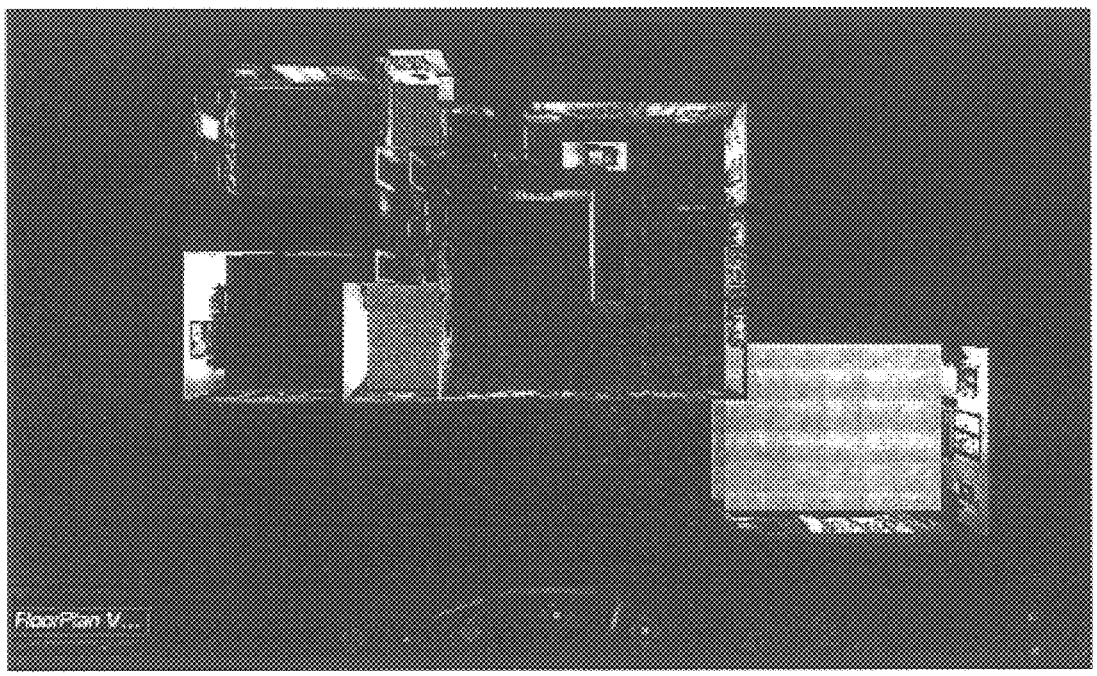

In this process, the user selects the point on an existing wall surface from which to build a new surface. System 100 then prompts the user to select the image file to use for the new surface. The user selects that image and enters in the angle of intersection, direction of the image normal, and vertical alignment. Once the new wall surface is built, the user can continue to build other surfaces from it as normal (adding new wall surface to the right). The island counter 800 in FIG. 8 was built using this type of procedure. In this particular example, a temporary wall was built out of the middle of an existing wall surface along line 802. The counter 800 was built off of the temporary wall by adding in successive wall surfaces to the right of previous surfaces to create the sides 804 of the counter 800. Once sides 804 are complete, the original "temporary" wall is deleted, and thus the counter is alone in the center of the room. Lastly, the floor creation tool is used to add a counter top 806 to the counter walls (see section 12 below).

12. Floor/Ceiling Tools

The creation of "floor and ceiling" type surfaces are handled in this process by a transformation of a two dimensional selected point on the source texture into a three dimensional point in the model space. This allows for multiple two dimensional points to be selected across multiple connected source textures and to have a complex Three dimensional polygon be created from this string of two dimensional points. This includes the handling of complex surfaces such as "Vaulted" ceilings and "inclined" floors.

The definition of the floor and ceiling type surfaces is achieved through a point selection process which allows the user to select vertex points in a two dimensional plane throughout multiple surfaces. The points are selected in a defined selection order, counter clockwise in a top-down representation. Upon completion of the selection list, the acquired points' positions are calculated in the model's three dimensional coordinate system and a surface texture is selected from the file open interface dialog box. This method of definition of these "capping" surfaces allows the creation of polygon surfaces in the model in which the user may not have a "clean" source image with which to create the surface, such as the case of a room's floor or ceiling surface which may be obscured with other objects or may be physically impossible to acquire in a single photographic image. This method of polygon definition also allows for rapid creation of multifaceted polygon surfaces such as a "Vaulted" ceiling due to the inherent nature of the polygon rendering engine's ability to automatically create multiple surfaces for a highly complex polygonal definition.

The process for the user has five steps. First the user selects the floor or ceiling building tool from the tool bar. Second, the user selects points in two or more wall images/surfaces to represent the outline of the floor or ceiling surface to be added. Third, the user selects and image file to use for the floor or ceiling section. Fourth, the user enters in parameters such as the size of the floor/ceiling section to be tiled. Fifth, the user clips the image section to represent the floor/ceiling. Once this is done, the 3D model has the floor/ceiling applied to it.

13. Adaptive Modifications

The internal data structure used for this construction process allows for real time modification and updating of any parameters which define a surface or region to be transferred onto all effected surfaces and regions throughout the remainder of a model. The mathematical relationships between each of the surfaces and regions is established at the initial construction time set the system for propagation of changes from one point in the system throughout the rest of the surfaces and regions. If a source wall is modified in some way then the updated information is transferred through any and all surfaces or regions which are connected to the newly modified surface or region. This allows for rapid correction and modification of the entire model with a single point of change, thus reducing the user interaction required to build the desired highly complex models.

14. Automatic Model Adjustment

To simplify the user's job and to make error free, exact seams between images in a model, system 100 uses an auto-fitting process which "snaps in to place" surfaces or regions ("polygons") next to one another so that no misalignment can occur and no space is left between the edges of the polygons during the model building process.

The building of complex objects containing many surfaces or regions such as property interiors has inherent cumulative errors which accumulate over the building process resulting in minute misalignments to remotely connecting surfaces and regions. These minute errors result in small gaps between surfaces and regions that should be contiguous (touching). System 100 uses an auto-fit process to correct for these cumulative errors by re-sizing and aligning the last connecting wall to the correct edge of the starting surface or region. This process calculates the correct orientation and surface or region dimensions to connect the final surface or region with the starting surface or region based upon the last edge of the previous connecting surface or region and the starting edge of the starting surface or region. The process calculates a direct line solution between the two points resulting in an exactly aligned and dimensioned resulting image.

15. Viewpoints

In one embodiment, the user has the ability to place special set viewpoints into the model, so that when viewed in three dimensions, the camera moves to the set locations. The user selects (clicks) a point in the top view window of the object. This action brings up a standard dialog box prompting the user to enter directional information and Field of View information for the new viewpoint. This can have many advantages for viewing. It allows the builder of the model to create a pre-defined "walk-thru" of the object or environment. It also lets the builder focus the viewer's attention to specific details in the model.

16. Perspective Correction

In certain source images (e.g. a very long and narrow hallway), it is not physically possible for the camera alignment with respect to the surface or region plane to be in the optimal perpendicular alignment. In these cases, a perspective distorted image of the desired surface or region is captured. When these images are read into System 100, the user has the option of applying a perspective correction procedure to the image. This procedure works only in the cases where both the nearest edge of the surface or region and the farthest edge of the surface or region in the image are known. The user selects the two edges of the surface or region in the image in the desired surface window and then a standard dialog box appears prompting for the user to enter both the near and far edges' lengths. Based on the difference of these two lengths, the algorithm calculates the true length of the desired surface or region and linearly transforms the texture to account for this distance based perspective distortion. The resulting textured surface or region is then "real world" visually correct when viewed from any angle by the end user.

Benefits

Models generated using this process have many benefits. They can be viewed and manipulated in many ways; moved around in, examined, rotated, zoomed in on, etc. FIGS. 9, 10, 11, and 12 demonstrates various models being manipulated to show off various techniques for viewing the models. The models may be manipulated in an analog fashion allowing for any desired viewpoint to be achieved through the combined use of the viewing modes. The models may also be viewed in a specifically ordered fashion through the use of a series of viewpoints defined in System 100, thus allowing the user to have a "guided tour" of the object, if that is so desired.

Part II.

In another embodiment, system 100 is used to adapt existing three dimensional wire-frame models based on the properties of texture that is to be placed on the models. This technology can be used in a variety of applications such as the printing and packaging industries through the creation of three dimensional computer models of printed media such as magazines, or three dimensional computer models of packages such as boxes, bags, and cans. It is also applicable to numerous other industries as well.

Classically, the proportions of a polygon in a model are pre-set when the model is generated. If images are applied as textures onto the model, the images go through transformations to change size and shape in order to map onto the individual polygons of the model. This embodiment of the present invention takes the reverse approach in that a polygon takes the shape and proportions of the image texture associated with it. This flexibility allows a large number of individual models to be created from a relatively small number of base model types. Thus, all six-sided box types and proportions can be created from one polygon model of a six-sided box, since the individual sides of the box will take the proportions of the corresponding image texture. Exact dimensions of the object can be generated and output for the user.

Overview

In one embodiment, the method uses three basic procedures to generate the three dimensional, textured model from one or more source images. First, system 100 determines the dimensions, in pixels, of a source image. Next, system 100 performs a series of transformations on target polygons of a selected model to resize it so that its dimensions match those of the source image. Finally, system 100 maps the texture from the image onto the correctly-sized polygons without having to distort or transform the image at all. One benefit of this process is that it maintains the integrity and quality of the source image since it never gets distorted as it might using a classical approach. Another benefit is that, given the dots-per-inch (dpi) value of the image, system 100 can extract real world dimensions from the image, and thus create a three dimensional model with real world dimensions.

In one embodiment, a single image may be mapped over multiple polygons of a model. System 100 automatically subdivides the image of a flattened three dimensional object, such as a box, into its separate images that correspond to each of the objects sides, e.g., for each polygon of the model. The process uses an edge-detection procedure to determine the boundaries of the object such as a procedure described in *Digital Image Processing,* Gonzalez, Rafael C., Woods, Richard E., Addison-Wesley Publishing, 1992. System 100 then determines the size of each sub-image from the boundaries of the image and divides the image into sub-images. System 100 applies the sub-images to the polygons on the model. Below is an example of this method adapted to the three dimensional package prototyping application, although many other applications could use this process. In an alternative embodiment, multiple images may be mapped onto subdivisions of a single polygon.

Packaging Example

In this example, a three dimensional, textured image of a six-sided box is created from a single image and a generic box model. To create the model, a user first supplies some information to system 100. For example, the user either selects an existing wire-frame model from a library of wire-frame models to match the shape of the object to be modeled. Alternatively, the user could provide or request a customized wire-frame model. Additionally, the user provides a digital version of the texture to be applied to the model. The user, e.g., package designer, converts a design into a single raster graphic image. The user then either uploads the image to a web site of a service provider having system 100 or provides the image to the service provider in another acceptable format, e.g., a CD ROM. In this example, the user provides a single image to be applied to a basic six-sided box model.

Figure 13:
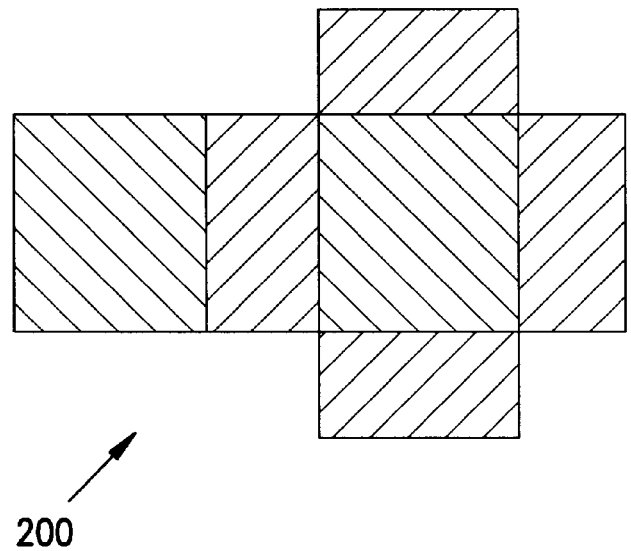
FIGS. 13, 14, 15, and 16 are graphical representations of an embodiment of a method for generating a three dimensional, textured model of an object from a single digital image containing texture for the surfaces of the model.
Figure 14:
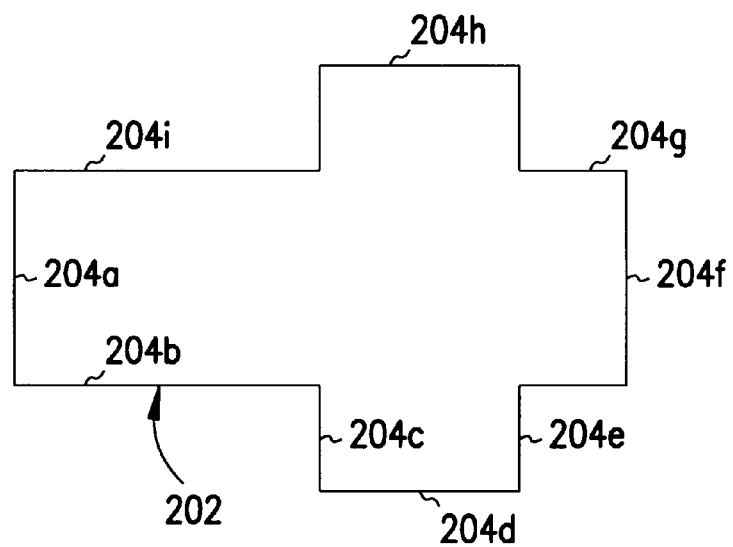
Figure 15:
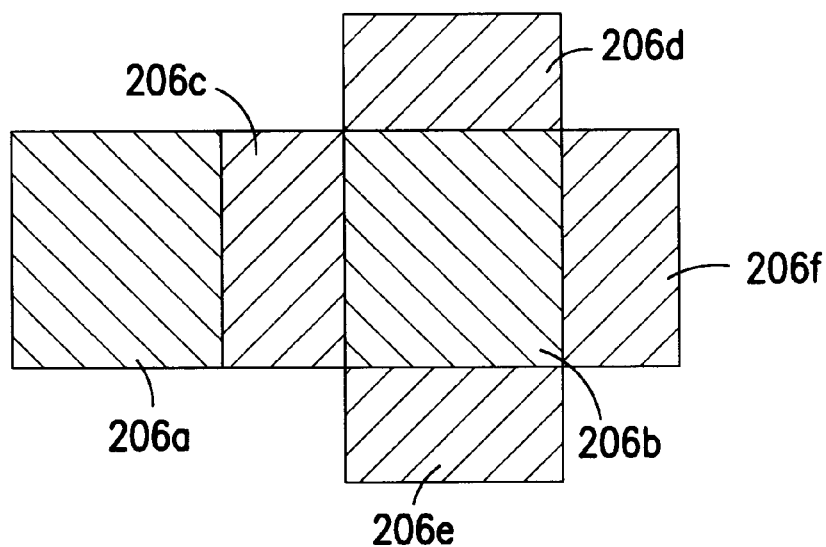

FIG. 13 is a plan view that illustrates the single image, indicated generally at 200 to be applied to the sides of a box. Essentially, the image is an unfolded flat object. System 100 uses the edge detection process described above to find create outline 202 of the texture in the image that is graphically represented in FIG. 14. System 100 then calculates the dimensions of each side 204a through 204i. These calculations differ of course for each object type, but the basic procedure, as outlined here for a box, is the same. For each model type certain things are known. For the box model, it is assumed that the box has six sides, that all angles are 90 degrees, and that opposite sides (i.e. top and bottom) are of the same size. Knowing that, system 100 can fully subdivide the outlined shape into six individual images 206a through 206g corresponding to sides of the box as shown in FIG. 15.

Figure 16:
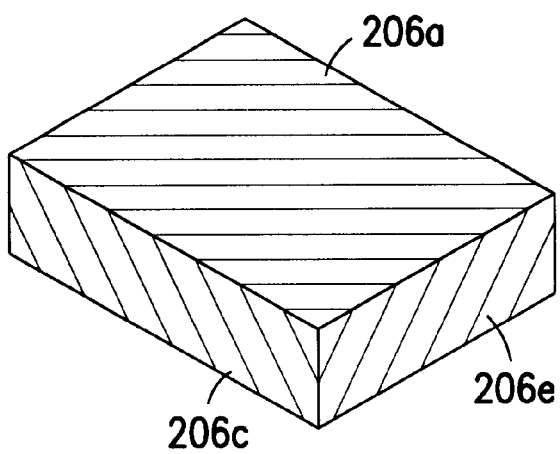

Once this is done, system 100 transforms the wire-frame model based on the calculated image dimensions. System 100 creates the three dimensional model from the separate images 206a through 206g by applying the images to the appropriate polygons of the model. The resulting model shown in FIG. 16 takes on the proportions of the source images and is thus dimensionally correct. System 100 outputs the model in any appropriate format. For example, the model can be output as a VRML file for viewing over the Internet. The VRML file can be posted to a password-secure web site where the user can view it.

In this example, the three dimensional model is created entirely from a single two dimensional image file in a completely automated process. System 100 can of course also build the object from multiple image files. In this case, system 100 skips the process of dividing the image.

Figure 17:
FIGS. 17, 18 and 19 are screen shots that illustrate a number of package models created according to the teachings of the present invention.
Figure 18:
Figure 19:
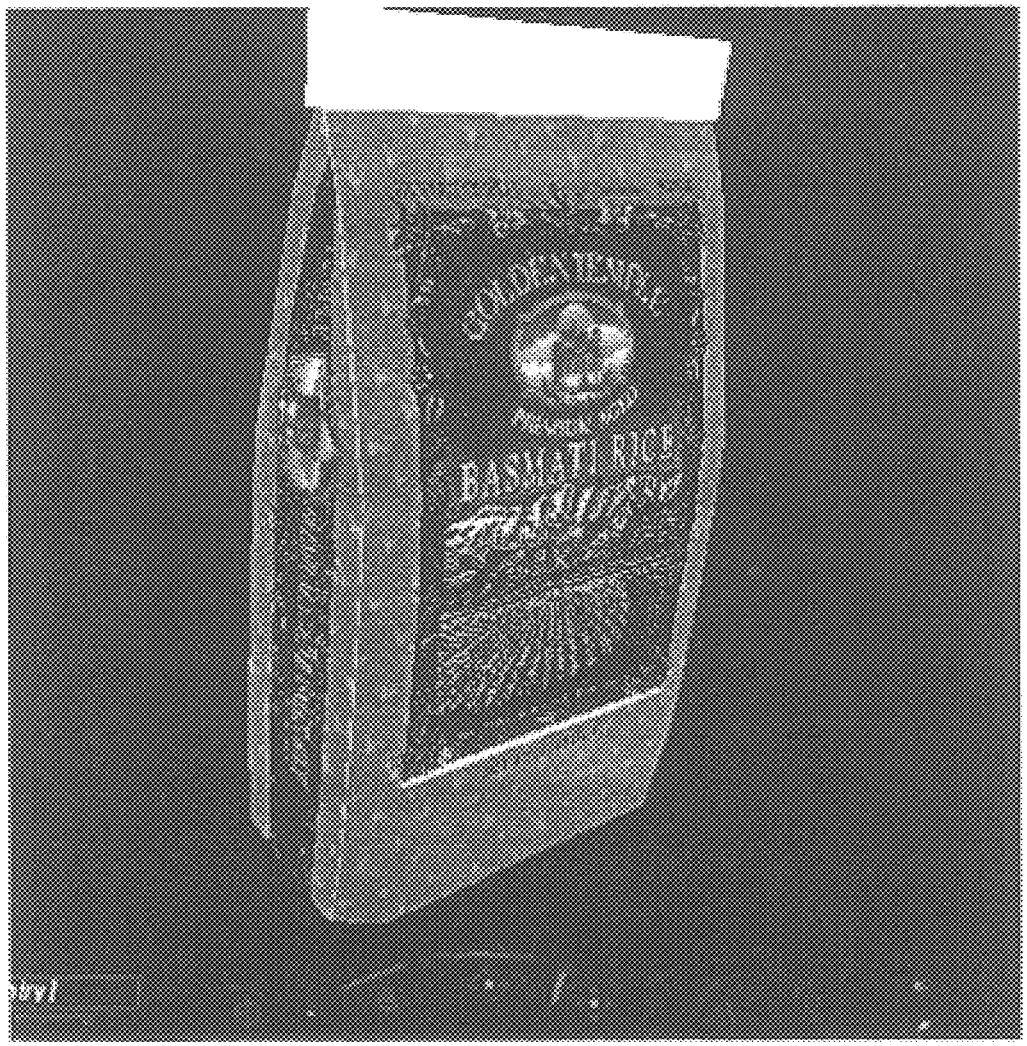

FIGS. 17, 18, and 19 are screen shots that illustrate a number of additional package models created using the techniques described above. In each of these examples, a basic wire-frame model was modified based on one or more images provided for application to the model. Once the models are modified, the images are applied to the polygons to provide the completed models shown in the Figures.

Three Dimensional Publishing Example

Figure 20:
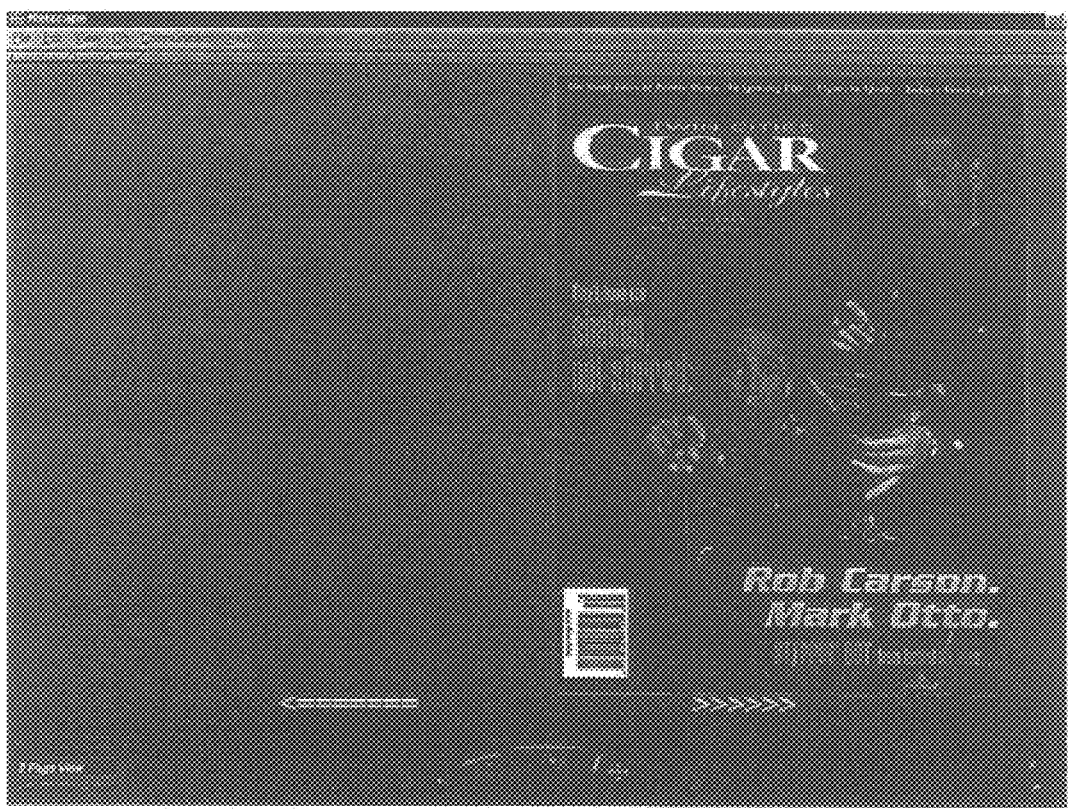
FIGS. 20, 21 and 22 are screen shots that illustrate a three dimensional, textured model of a magazine constructed according to the teachings of the present invention.
Figure 21:
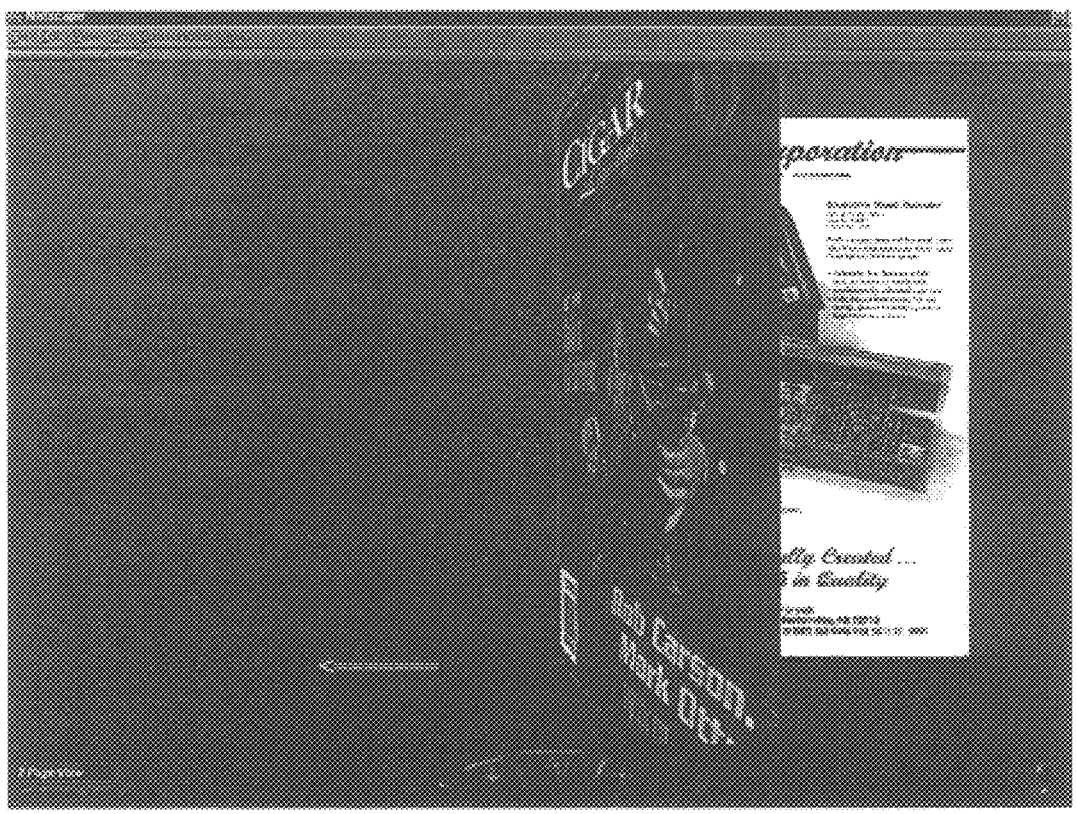

In another embodiment, system 100 includes a fully-automated process that converts a form of printed media such as magazine, book, newspaper, etc. into a three dimensional animated, interactive model of the printed media that retains all visual format and features of the original as shown in FIG. 20. System 100 converts the file in which the printed media is defined (such as a Quark™ file, text file, word processing file, etc.) into a multi-page three dimensional model of the printed material. This model represents each page exactly in print quality. System 100 outputs the model, for example, in VRML format for Internet distribution.

Figure 22:
Figure 23:
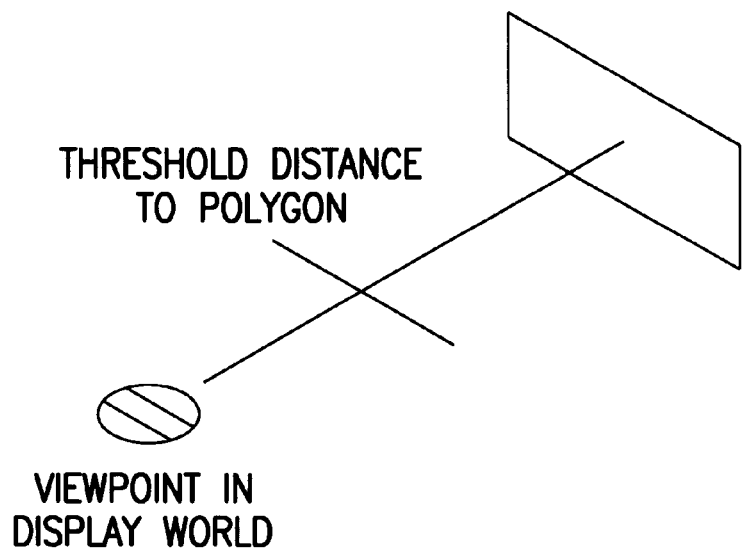
FIGS. 23 and 24 are schematic diagrams that illustrate an embodiment of technique for controlling the resolution of images in a three dimensional model according to the teachings of the present invention.

The model is generated from the printed media source file by reading the file into system 100 and converting it into a series of textures corresponding to each page of the printed media. The images and text that make up a single page are overlaid and adjusted in resolution to optimize performance while maintaining image quality (for reading fine print, etc.). Once the images of each page have been processed, the images are texture mapped onto each "page" of the appropriate wire-frame three dimensional model. For a magazine, the model consists of a dynamic (based on the number of pages in the printed media source file) number of polygons joined together (bound) on the left side. The model also includes animation to simulate page turning as shown in FIGS. 22 and 23. The inherent properties of a page contain the information about the animation path for that page as a predefined quality of a page. The page is defined by a left edge and a front and back surface to the page. The animation then follows a predefined path knowing the relative positions of both surfaces. The animation of the "document" as a whole is set as a system property through a conventional dialog box interface where the user selects from a group of possible document types encompassing the majority of printed media formats.

A wire-frame model of a book or magazine is not fundamentally different than that of a box or jar, and the processes described above for transforming the model to fit the image dimensions, mapping the textures onto the polygons of the model, etc. all apply to this application as well. The primary difference in this embodiment is that system 100 works from a Quark file, or similar page layout file, rather than just a two dimensional image file. Thus, system 100 has much more information, such as the exact number, placement and dimensions of the pages, about the object to be created and thus needs less user input to create the model.

Advantageously, the embodiments described in Part II allow for a completely digital processing of data without the need for expensive and time consuming hard copy printing. Further, the embodiments provide for automated generation of the three dimensional models once the model type (box, can of a certain style, etc.) is chosen and the source images are provided to system 100 by the user. Further, print-quality resolution is possible through this process. In fact, there is no substantial image resolution limit since all images can be zoomed in on indefinitely. Due to web-based distribution, there may be present day bandwidth issues that would set practical limits on image resolution for certain applications, however.

Image Resolution

Figure 24:
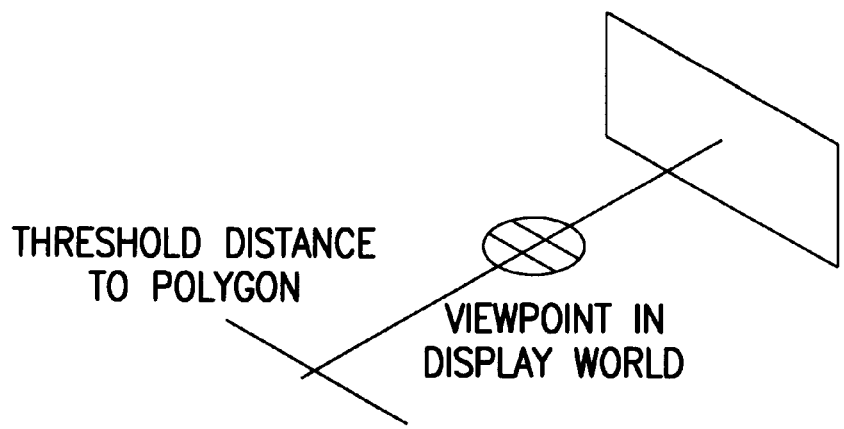

The ability to present the extremely high resolution surface textures needed to effectively portray the desired information about the modeled objects with limitations in the destined display hardware found on most modem personal computers is important to usefulness of the generated models using the technology of Parts I and II. The solution to this problem is achieved through the use of dynamically loading and unloading the required textures in the model from the Hard Disk drive source files and the physical RAM available on the computer used to view the images. This solution uses the viewpoint position information within the browsing software to trigger the real-time loading and unloading of the high resolution textures from physical RAM while still displaying the low resolution textures for the remainder of the model. This loading and unloading is determined by some variable such as, for example, the distance from the viewpoint to the polygon being displayed, page flips, a user selected state variable or other appropriate variable. As shown in FIGS. 23 and 24, as the viewpoint comes closer to the polygon, the low resolution base texture is replaced with successively higher resolution textures and the unused and undisplayed polygons in the remainder of the model have either very low resolution textures in memory or no textures in memory at all. This optimizes the memory usage on the display machine in a method which significantly surpasses the conventional "disk caching" technology found in most personal computers by requiring a very minimal portion of the high resolution textures to be loaded into system memory at any one time. The use of the low resolution images optimizes the limitations of the display screens which the finished models will be viewed upon while simultaneously allowing as high detail as is desired for the application.

Figure 25:
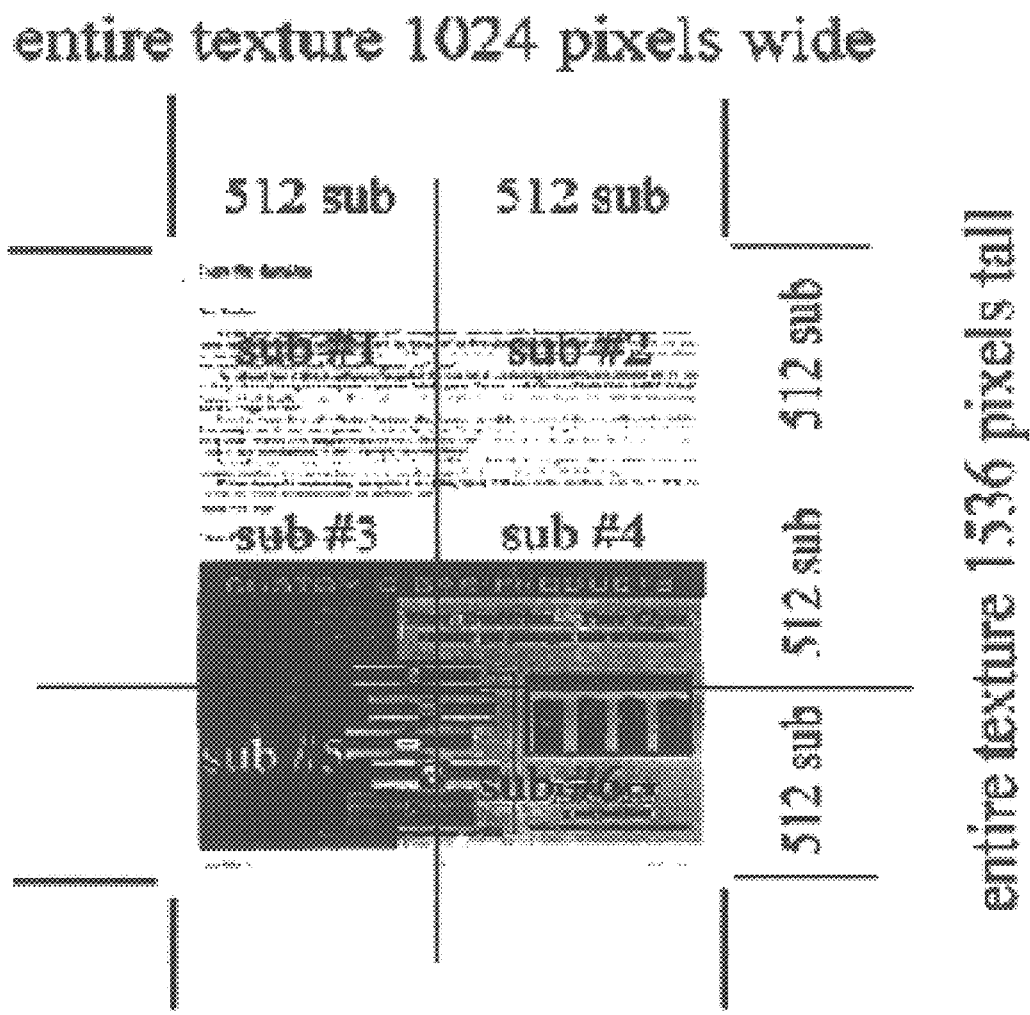
FIG. 25 is a graphical representation of an embodiment of a technique for sub-dividing a three dimensional model for display at various levels of resolution according to the teachings of the present invention.

The source images used in all of the above processes may be of any desired resolution. The resolution is controlled only by the level of detail desired in the generated data set. The initial resolution may be any desired amount greater than the maximum resolution supported by the intended display hardware or software. This resolution independent output data is achieved through a process termed "texture subdivision" wherein the initial surface and corresponding texture are subdivided dynamically into smaller regions determined by the maximum allowable texture resolution on the intended display hardware or software. Each sub region is defined by the maximum resolution allowable in the original texture with the geometry of the sub regions being determined by the sub divided texture regions. An example of this subdividing of the texture is shown by way of example in FIG. 25.

The subdivision size may be varied to accommodate multiple resolution output files without the need to re-enter the source data set. The ability to alter the compression level used in the output files is also inherent in this process. This allows for multiple quality output files to be generated from the same source file without the need for reprocessing.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, Part II describes an example of an embodiment of the present invention in which texture was applied to a six sided box for purposes of illustration. It is noted that the same process works for any type of three dimensional object or package including bags, cans, bottles, etc. as shown in FIGS. 19A through 19C. The only requirement is that a three-dimensional wire-frame model be built for the object type.

The embodiments of Parts I and II are described as distributing the three dimensional models over the Internet. It is understood that other mediums can be used to distribute and view the three dimensional models, e.g., CD ROM, etc. Further, it is noted that the models described in both Parts I and II are highly suitable to multiple forms of sophisticated compression including traditional Huffman encoding extended into a three dimensional space as well as conventional Discrete Cosine Transformations to the solution three dimensional data sets.

Further, once a model is created using any of the above described methods, spatially located links to other media, etc. can be incorporated into the model. For example, sound can be linked to an object, so that the object plays the sound automatically or when the user does some action such as "clicking" on it, etc. Video clips can be mapped onto walls or other objects. Internet "hyperlinks" can be associated with an object, so that, for example, a three dimensional model of a sofa can bring the user to the manufacturer's web site when the user clicks on the sofa.

The embodiments of Parts I and II are described in terms of examples in the real estate, packaging and printed media industries. It is understood that these embodiments are shown and described by way of illustration and not by way of limitation. Rather, the systems and methods described are equally applicable to, for example, creating three dimensional, textured models for newspapers, books, post cards, greeting cards, playing cards, photo albums, clothes, building exteriors, home furnishings, cars, packaged goods, folders, office products, computers, cameras, medical devices and equipment, machinery, mechanical parts, tools, exercise equipment, toys, jewelry, musical instruments, online CD sales, book sales (by displaying the front and back covers), magazines, corporate image products (mugs and caps with logos), real estate interiors, remodeling of interiors (base model to be used with additional software package), online grocery shopping.

What is claimed is:

1. A method for creating a three dimensional, textured model of at least one object from a number of two dimensional images, the method comprising:
    loading an initial two dimensional image;
    identifying a region of the at least one object in the loaded, two dimensional image;
    storing data concerning the region, including its texture, in a data structure;
    sequentially loading the remaining two-dimensional images; and
    for each of the remaining two dimensional images:
        identifying a relationship between the two dimensional image and at least one other, loaded two dimensional image,
        identifying a region of the at least one object in the two dimensional image, and
        storing data concerning the region, including information on its position with respect to other regions, and the texture of the region, in a data structure.

2. The method of claim 1, and further comprising preprocessing the images to identify interrelationships between the images by viewing thumbnails of each image and identifying the interrelationships.

3. The method of claim 1, and further comprising identifying a dimension of a region in an image to provide a basis for correlating the relative size of the images.

4. The method of claim 1, and further comprising acquiring the images with a wide angle lens.

5. The method of claim 4, and further comprising removing distortions in the image created by the wide angle lens.

6. The method of claim 1, and further comprising converting each image into a plane pixel array prior to processing.

7. The method of claim 1, and further comprising transforming a region to align edges of connecting regions from first and second images.

8. The method of claim 1, wherein identifying a region comprises identifying the vertices of the region using a clipping tool.

9. The method of claim 8, wherein identifying the vertices comprises identifying vertices of a four sided polygon.

10. The method of claim 1, and further providing real time display of a top view of the model.

11. The method of claim 1, and further providing a three dimensional view of the model that is updated as regions are added to the data structure.

12. The method of claim 1, wherein storing data in a data structure comprises storing data in a data structure that includes a WorldObject with data on the overall model, including a linked list of all regions, and a number of SurfaceObjects that contain data on each of the regions, including a pixel array with the texture for the region.

13. The method of claim 1, and further including defining openings in a region.

14. The method of claim 13, and further automatically aligning openings in back to back regions.

15. The method of claim 1, and further defining regions that intersect another region at a line other than an edge of the region.

16. A method for creating a three dimensional, textured model of at least one object, the method comprising:
    identifying regions of the at least one object in a number of two dimensional images of the at least one object;
    interrelating the regions identified from the two dimensional images; and
    storing data concerning the region, including its texture, in a data structure that represents the model of the object.

17. The method of claim 16, and further comprising preprocessing the two dimensional images to identify interrelationships between the two dimensional images by viewing thumbnails of each two dimensional image and identifying the interrelationships.

18. The method of claim 16, and further comprising identifying a dimension of a region in an image to provide a basis for correlating the relative size of the images.

19. The method of claim 16, and further comprising transforming a region to align edges of connecting regions from first and second images.

20. The method of claim 16, wherein identifying a region comprises identifying the vertices of the region using a clipping tool.

21. The method of claim 20, wherein identifying the vertices comprises identifying vertices of a four sided polygon.

22. The method of claim 16, and further providing real time display of a top view of the model.

23. The method of claim 16, and further providing a three dimensional view of the model that is updated as regions are added to the data structure.

24. The method of claim 16, wherein storing data in a data structure comprises storing data in a data structure that includes a WorldObject with data on the overall model, including a linked list of all regions, and a number of SurfaceObjects that contain data on each of the regions, including a pixel array with the texture for the region.

25. The method of claim 16, and further including defining openings in a region.

26. The method of claim 25, and further automatically aligning openings in back to back regions.

27. The method of claim 16, and further defining regions that intersect another region at a line other than an edge of the region.

28. A method for generating a three dimensional, textured model of at least one object, the method comprising:

determining the dimensions, in pixels, of at least one source image;

performing a series of transformations on target polygons of a selected model to resize the model so that its dimensions match those of the at least one source image; and mapping the texture from the at least one source image onto the correctly-sized polygons without having to distort or transform the image.

29. The method of claim 28, and further comprising selecting a model from a library of models.

30. The method of claim 28, and further comprising posting the completed image to an Internet site.

31. The method of claim 28, and further comprising receiving the source image at an Internet site over the Internet.

32. The method of claim 28, wherein the source image comprises images for a packaging label.

33. The method of claim 28, wherein the source images comprises images for printed media.

34. The method of claim 28, and further comprising sub-dividing the image into a number of images for mapping to the polygons of the model.

35. The method of claim 34, wherein sub-dividing the image includes detecting the edges of the image.

36. The method of claim 28, and further comprising generating the source image from a data file.

37. The method of claim 28, and further comprising generating the source image from a format defining data file for a printed media.

38. A method for generating a three dimensional, textured model of at least one object from a single texture image, the method comprising:

selecting a wire-frame base model;

loading the single texture image;

detecting the edges of the image to find an outline;

subdividing the image into multiple images based on the selected model and the outline;

determining image sizes;

adjusting the dimensions of the model based on the dimensions of the images;

applying the subdivided images to the adjusted model; and outputting the model into a selected format.

39. The method of claim 38, and further comprising posting the completed image to an Internet site in VRML format.

40. The method of claim 38, and further comprising receiving the source image at an Internet site over the Internet.

41. The method of claim 38, wherein the source image comprises an image for a packaging label.

42. A machine readable medium having instructions stored thereon for causing execution of a method comprising:

identifying regions of the at least one object in a number of two dimensional images of the at least one object;

interrelating the regions identified from the two dimensional images; and storing data concerning the region, including its texture, in a data structure that represents the model of the object.

43. A machine readable medium having instructions stored thereon for causing execution of a method comprising:

determining the dimensions, in pixels, of at least one source image;

performing a series of transformations on target polygons of a selected model to resize the model so that its dimensions match those of the at least one source image; and mapping the texture from the at least one source image onto the correctly-sized polygons without having to distort or transform the image.

* * * * *